(12) United States Patent
Tan et al.

(10) Patent No.: US 10,950,228 B1
(45) Date of Patent: Mar. 16, 2021

(54) INTERACTIVE VOICE CONTROLLED ENTERTAINMENT

(71) Applicant: Amazon Technologies, Inc., Seattle, WA (US)

(72) Inventors: Alfred Yong-Hock Tan, Bellevue, WA (US); Matthew Luker, Port Angeles, WA (US); David Allen Markley, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 15/635,576

(22) Filed: Jun. 28, 2017

(51) Int. Cl.
| | |
|---|---|
| *G10L 15/22* | (2006.01) |
| *G10L 25/57* | (2013.01) |
| *H04N 21/2187* | (2011.01) |
| *G10L 13/08* | (2013.01) |
| *H04N 21/422* | (2011.01) |
| *H04N 21/43* | (2011.01) |
| *H04N 21/478* | (2011.01) |
| *H04N 21/81* | (2011.01) |
| *G06F 40/279* | (2020.01) |
| *G10L 13/00* | (2006.01) |
| *G10L 15/26* | (2006.01) |

(52) U.S. Cl.
CPC ............ *G10L 15/22* (2013.01); *G06F 40/279* (2020.01); *G10L 13/00* (2013.01); *G10L 13/08* (2013.01); *G10L 15/26* (2013.01); *G10L 25/57* (2013.01); *H04N 21/2187* (2013.01); *H04N 21/42203* (2013.01); *H04N 21/4302* (2013.01); *H04N 21/4781* (2013.01); *H04N 21/47815* (2013.01); *H04N 21/8126* (2013.01); *G10L 2015/223* (2013.01)

(58) Field of Classification Search
CPC ....................................................... G10L 15/22
USPC ........................................ 704/235, 270, 275
See application file for complete search history.

(56) References Cited

U.S. PATENT DOCUMENTS 6,442,518 B1 * 8/2002 Van Thong ............. G10L 15/26
704/235
8,413,206 B1 * 4/2013 Wyatt ............... H04N 21/25866
725/136

(Continued)

*Primary Examiner* — Shaun Roberts
(74) *Attorney, Agent, or Firm* — Pierce Atwood LLP

(57) ABSTRACT

Methods and systems for receiving shouted-out user responses to broadcast entertainment content, and for determining the responsiveness of those responses in relation to the broadcast content. In particular, entertainment broadcasts can be accompanied by mark-up data that represents various events within a given broadcast, which can be compared to the shouted-out responses to determine their accuracy. For example, if a game show was broadcast and an individual started shouting out answers during the broadcast, embodiments disclosed herein could utilize a voice-controlled electronic device that captures the shouted-out answers and passes them on to a language processing system that determines whether they are correct by comparing the answers to the mark-up data. The voice-controlled electronic device can also "listen" to background sounds to capture the broadcast of the entertainment content, and send that content to the language processing system, which can use that captured data to synchronize the actual broadcast with the analysis of the shouted-out answers to provide individuals with an immersive entertainment experience.

20 Claims, 7 Drawing Sheets

(56) References Cited

U.S. PATENT DOCUMENTS

| | | | | |
|---|---|---|---|---|
| 2004/0054826 | A1* | 3/2004 | Kavanagh | A63F 13/10 |
| | | | | 710/62 |
| 2008/0155633 | A1* | 6/2008 | Watson | H04N 7/163 |
| | | | | 725/114 |
| 2009/0300143 | A1* | 12/2009 | Musa | H04N 7/17318 |
| | | | | 709/218 |
| 2011/0072466 | A1* | 3/2011 | Basso | G11B 27/10 |
| | | | | 725/47 |
| 2011/0135278 | A1* | 6/2011 | Klappert | G06F 17/241 |
| | | | | 386/278 |
| 2011/0184735 | A1* | 7/2011 | Flaks | G06K 9/0057 |
| | | | | 704/240 |
| 2015/0074698 | A1* | 3/2015 | Pinto | H04N 21/4756 |
| | | | | 725/14 |
| 2015/0382047 | A1* | 12/2015 | Van Os | G06F 16/73 |
| | | | | 725/38 |
| 2016/0275588 | A1* | 9/2016 | Ye | G06F 3/0488 |
| 2018/0054506 | A1* | 2/2018 | Hart | H04M 1/271 |
| 2018/0063249 | A1* | 3/2018 | Nguyen | H04L 67/125 |
| 2018/0318711 | A1* | 11/2018 | Hunt | A63F 13/215 |

* cited by examiner

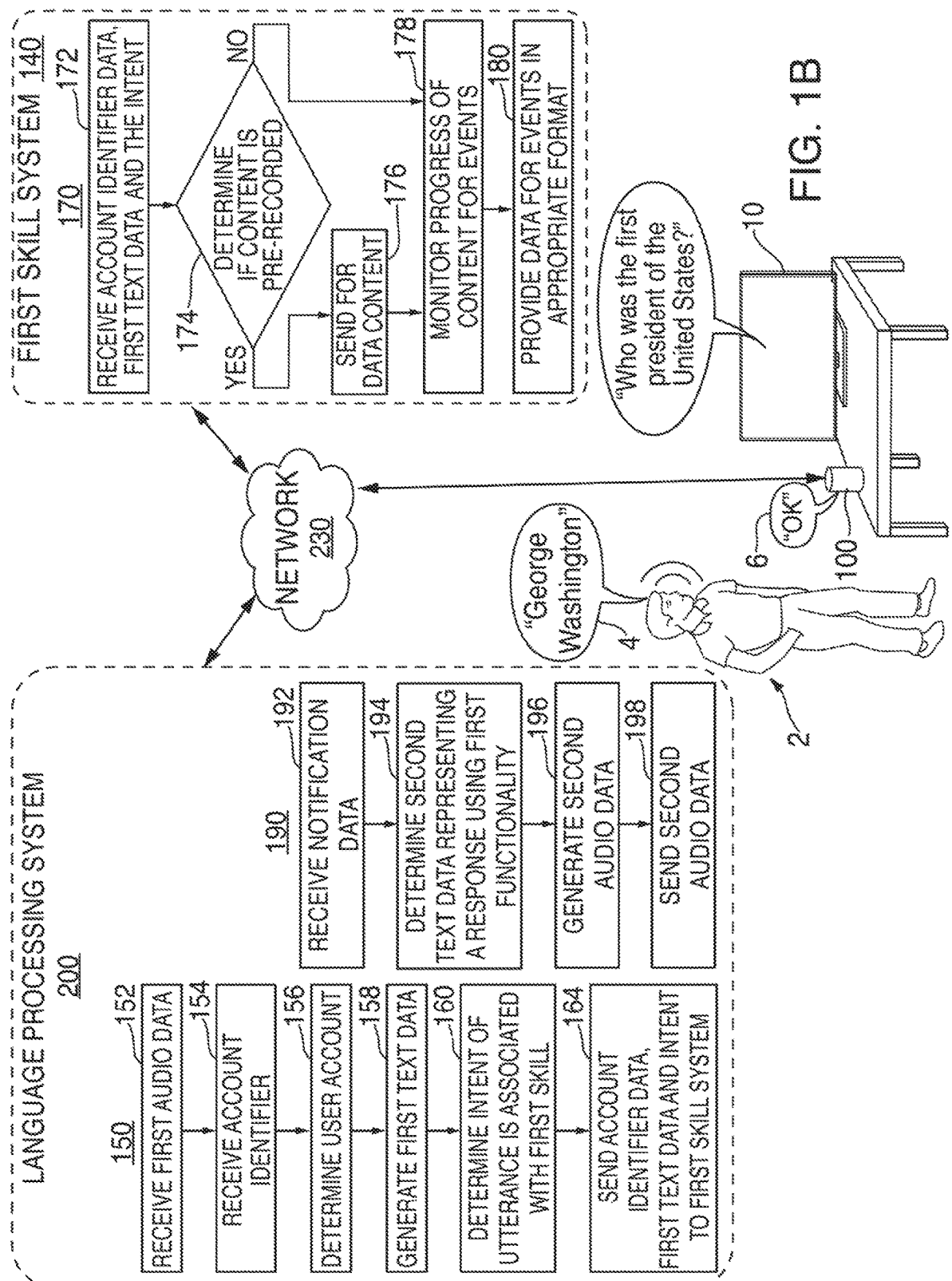

INTERACTIVE VOICE CONTROLLED ENTERTAINMENT

BACKGROUND

With each passing day, more and more entertainment is provided in a variety of ways, delivered to display screens on various electronic devices, such as televisions, computers, tablets, etc. In many cases, people may find themselves immersed in the entertainment experience, shouting out answers to questions or trying to predict what their favorite team will do next. Some electronic devices, such as voice activated electronic devices, are capable of performing various functionalities based on spoken words.

BRIEF DESCRIPTION OF THE DRAWINGS

FIG. 1B is an illustrative diagram of an exemplary system for interacting with the system of FIG. 1A to perform a first action based on spoken words, in accordance with various embodiments;

DETAILED DESCRIPTION

Figure 1A:
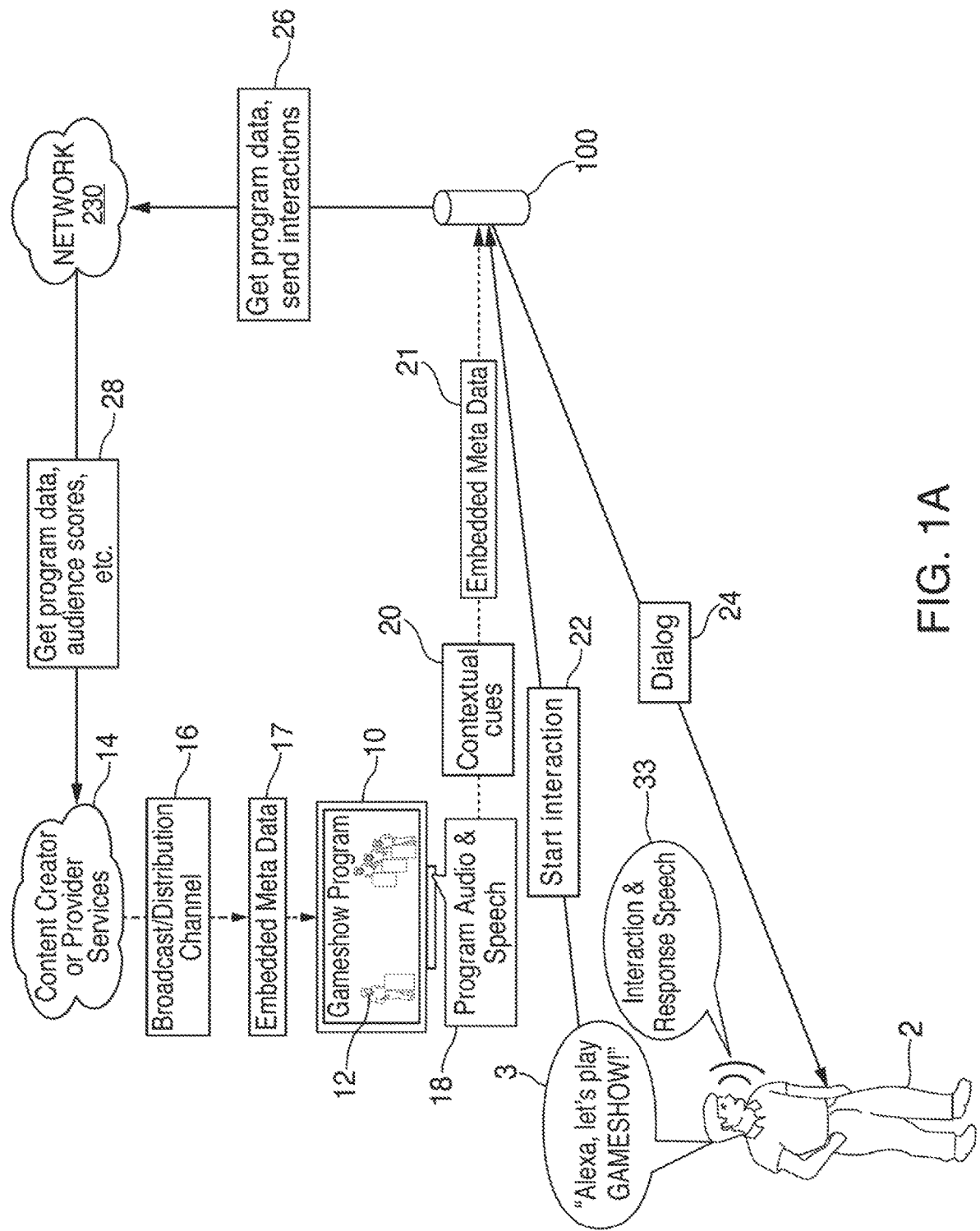
FIG. 1A is an illustrative diagram of an exemplary system for utilizing a voice-controlled electronic device to enable people to interact with broadcast entertainment content, in accordance with various embodiments.

The present disclosure, as set forth below, is generally directed to various embodiments of methods and systems for enabling individuals to immerse themselves in broadcast entertainment. In particular, individuals watching broadcast entertainment may utilize voice commands to invoke an application (such as a skill) on or otherwise associated with a voice-controlled electronic device to initiate an integrated entertainment experience. In some embodiments, that skill can to be linked to the individual's account with a language processing system such that past and ongoing usage of the skill can be complied and presented to the user. For example, if an individual watches a certain game show, the individual can utilize the embodiments disclosed herein to "participate" with the game show utilizing a voice-controlled electronic device and a natural language processing system that can analyze spoken words from the individual as well as spoken words coming from the broadcast. The language processing system may then be capable of comparing data representative of spoken words from the individual and the broadcast to enable the individual to play along. When, for example, the host of the broadcast asks the game show participants a question and the individual shouts out the answer, the voice-controlled electronic device can record that answer and process it with broadcast information that may be pre-loaded into the natural language system and/or that may obtained as the broadcast occurs, such as data embedded within the broadcast or data that may be independently sent to the language processing system (such as, for example, through an internet connection) in conjunction with the broadcast occurring (such as, for example, a traditional over-the-air broadcast). As the individual gets answers right or wrong, the natural language system can tabulate a score for the individual as if the individual was on the show. Once the show is completed, the natural language system can produce a message (such as a text message, audible message, video message, etc.) to let the individual know how the individual did, and to deliver that message to the individual in an appropriate format for whatever type of electronic device that individual is using at the time.

In connection with the various embodiments disclosed herein, "broadcast" may include any of a number of different manners in which an individual experiences content. For example, broadcast can refer to traditional over-the-air transmission and receipt of content from broadcast networks, such as CBS, NBC, ABC, etc., to traditional televisions. Broadcast can also refer to similar transmissions that may occur through cable or fiber-optic content providers such as Xfinity, Charter, Comcast, Cablevision, Spectrum, Verizon, etc., and can also include satellite content providers such as Dish, Direct TV, etc. Broadcast can also refer to content that is provided through an internet connection that may be streamed "live," or downloaded on-demand, which may occur through services such as Amazon Prime, Hulu, Netflix, YouTube, etc. In addition, broadcast is not be limited to video content and can also include audio-only content, such as podcasts, traditional radio, internet radio, etc. Many of the features described herein in various embodiments also can be applied to audio-only broadcasts to immerse individuals in content experiences, such as sporting events, game shows, trivia contests, etc. Individuals might, for example, be on a long drive and have access to a voice-controlled device (e.g., the automobile itself could also function as a voice-controlled device as described herein). Any of the game shows described herein, or other game shows or similar content, could be broadcast in an audio-only version and the individual could play along in the same manner described elsewhere herein.

In non-limiting embodiments, the voice-controlled electronic device and the natural language processing system can work in conjunction with each other to process and analyze different forms of data. For example, the device and system can work together to record spoken words from the individual, to convert those words from the analog recorded format (i.e., analog information) to a digital format, to transmit the digital representations of the analog recorded information to the language processing system which can analyze the digital representations using automatic speech recognition (ASR) techniques to determine the words that were recorded. The language processing system can then analyze the determined words using natural language understanding (NLU) techniques to place the spoken words in context in order to determine an appropriate response. For example, if a game show host on television, radio, or any other "broadcast" medium asks: "Who was the first President of the United States?" and the individual shouts out (or simply says) "George Washington," the voice-controlled device would record the analog signals of the spoken words "George Washington," convert those signals to digital representations, and send those representations to the language processing system. The language processing system, already aware that the individual is watching the game show, should know (or be able to determine) which question the individual was answering such that the system, after determining that the spoken words are actually "George Washington" (using ASR techniques), process the digital representation of those words using NLU techniques which have been adjusted based on the game show skill, such that the NLU could determine which question was being asked and whether the shouted out answer was correct. In this manner, the individual could effectively be playing the game just as the actual competitors are playing, and have a score that could be compared to the actuals scores from the broadcast of the game.

Some embodiments may be capable of determining whether an individual "shouted-out" an answer (as they became immersed in the content experience), other individuals can simply speak their answers in a normal voice with normal rhythm and volume while still utilizing some or all of the features disclosed herein. In addition, the voice-controlled device and language processing system described below can implement the embodiments disclosed herein with non-textual inputs, such as screams and yells, provided the appropriate skill is enabled such that the devices and systems described herein are aware of what type of audio inputs to monitor for. One example described in more detail below might be a skill related to broadcasts (live, streamed, pre-recorded, or otherwise), of professional football games, in which the voice-controlled device and language processing system might capture and analyze the grunts and moans that a typical fan makes as big hits are made for or against the individual's team, to provide feedback to the individual as the game progresses.

Once the NLU determined whether the shouted out answer was correct, the language processing system might proceed in a number of different ways. For example, using pre-recorded speechlets, the system might format the digital representation of a text response "Great answer" from a given speechlet using text-to-speech (TTS) techniques, transmit that digital representation to the voice activated electronic device which converts the digital representation to analog signals and outputs those analog signals through one or more speakers, such that the user hears the device say "Great Answer!" shortly after the individual shouted out their answer. Feedback might also be provided to the individual in other manners, such as by providing an audio stream that could include, for example, a chime for correct answers and a buzzer for incorrect answers, or push-down video clips if the voice-controlled device includes a display screen, such as a video clip of hands clapping, or of confetti falling, or fireworks going off (such as, for example, if the player achieves a new high score).

In addition to providing audio feedback to the individual (or instead of providing such feedback), the language processing system may access the portion of the user account of the individual connected with the game show skill to update any prior stored scores for the given game. In addition, when the broadcast is over, the language processing system can also provide a number of different ways for the individual to compete with and track others' progress, and to provide audio feedback about the current progress. For example, once the game show ends, the language processing system could say: "Great game today, you scored 120 points and now have 20 more points than your brother!" The output message could be produced using preformatted speechlets having slots for certain information, such as, in this case, today's score and the relative score with respective to the brother. In that instance, the preformatted output message that could be created from speechlets could be "Great game today, you scored _AA_ points and now have _BB_ _CC_ points than your brother!" "AA" would be the number of points scored today, "BB" would be the number of points the individual is relative to the brother, and "CC" would be whether the individual had "more" or "less" than the brother's point total. The score could be updated in the individual's account each time the individual played the game, and weekly, monthly and/or annual scores could be reported automatically, depending on the user's selected preferences. The language processing system could also keep track of scoring locally, city-wide, etc., and report, for example "Hey Seattle, we scored 120,500 points last night on Game Show—join us tonight to help us be the Number 1 city in the USA!" to all of the registered players.

In some embodiments, pre-recorded broadcasts can be accompanied with a program data file that can include, among other items, a time-line of the broadcast, events in the broadcast, commercials in the broadcast, the name of the host, the name of the contestants for each individual broadcast, the scores of those contestants, the correct answer for each question in the broadcast, alternative acceptable answers (for example, if the question was "Name a four legged animal that meows," the answer might be "cat" and acceptable alternative answers might include "kitty," "kitten," "feline," etc.). The additional information may be stored as metadata, or it may be organized in any number of ways provided that it can be accessed and retrieved quickly and easily, due to the timing limitations inherent in a real-time interactive system that the individual is using. The system can only accommodate a certain amount of latency between providing a response to a shouted out answer. If that amount is exceeded, the system may still be processing the response for one question while the individual is already shouting out an answer for the next question. Such a situation could lead to an undesirable and frustrating user experience that might result in the loss in the number of individuals playing. Additionally, if such latencies build up across the system, they could result in system faults that could crash the entire interactive experience until the system is reset.

In some embodiments, the program data file could include mark-up data that represents what happened during the broadcast. The mark-up data could be related to, and grouped together with, similar types of events. For example, a given program data file could include a series of mark-up data related to each of the questions for a given episode of a game show, while a different series of mark-up data could be grouped together that are related to commercials that are broadcast when the game show is broadcast in a specific market. In such instances, the commercial mark-up data could be used by sponsors to direct offers to individuals playing the game show at home, such as if the third commercial was for a given soft drink, when the game show ends, a text message could be prepared and sent for playback as an audio message to the voice-controlled device "Would you like me to place some soft drink in your shopping cart?"

In other instances, the language processing system working with the electronic device could capture a statement by the individual related to a commercial that the language processing system would know was being viewed pursuant to the current broadcast, and respond accordingly. This might include, for example, when the user is watching a commercial for paper towels and says nothing more than "buy that for me." In that example and other similar examples, the mark-up data associated with the commercial might have a slot for the product and another slot for the identity of the brand. The timing of when the commercial occurs relative to the particular mark-up data can provide the context to the language processing system to resolve the intent of the captured utterance "buy that for me" to be resolved as "by the paper towels I just saw" for me, which can then result in an order for those paper towels to be placed in that user's shopping cart and the order can then be submitted automatically (or, for example, with a prompt to the user for confirmation).

In some embodiments, the broadcast may not be pre-recorded and may instead be a live event, such as a sporting event. In that case, the availability of mark-ups may be limited, but may still be available for information such as: the site of the sporting event, host city, teams playing, names and uniform numbers of each of the players for both teams, names of coaches, historical information of prior matches between the same two teams, etc. It may also be possible for the content provided to have one or more employees on-site or observing the event remotely that can create additional mark-ups in a real-time manner as the event is occurring. For example, every time a score occurs, the employee(s) could quickly update the score, then supplement the score with the name of the scoring player, then supplement the supplement with players involved in the scoring play (and the type of play, etc.). In this manner, the mark-up need not be fixed, but can be an evolving form of data that gets improved as the employees have the opportunity to supplement the information. In many instances, many live broadcasts are transmitted with a minor time delay for, among other reasons, security. That time delay may be more than enough time for employees to create at least partial mark-ups of important events that occur during the live broadcast, which can then be supplemented as time and opportunity is available to do so.

In some embodiments, the voice-controlled electronic device can, in addition to listening for shouted-out answers from the individual, also listen to the general background. In listening to the general background, the voice-controlled electronic device can record spoken words from the broadcast that are played on the speakers associated with the display screen on which the broadcast is being displayed. The speakers may be integral with the display screen, or they may be completely separate, such as a stereo system that is coupled to receive the audio output of the broadcast signals (e.g., through an HDMI cable connected to an HDMI output on the display screen). The voice-controlled electronic device can, as described above, convert the recorded words from the broadcast audio into digital representations of the analog audio signals and communicate those representations to the language processing system. The language processing system can convert the digital signals to words using ASR, and then process those words using NLU techniques in order to determine that: (i) the spoken words were not a shouted-out answer; and (2) the spoken words are from the currently on-going broadcast related to the invoked skill (e.g., the "Game Show" skill). The language processing system can then use the received digital representations of the broadcast spoken words to synchronize and enhance further analysis of shouted-out answers with the timing and sequence of the entertainment broadcast to further increase the probability of correctly matching the shouted-out answers with the corresponding broadcast questions (even when the shouted-out answers are incorrect, the language processing system needs to be able to determine that the shouted-out answer corresponds to a specific question, or else the synchronization for future questions/answers will be misaligned).

In some embodiments, the language processing system may be able to determine the specific location/market that the broadcast is occurring in, for example, by determining which advertising is broadcast during commercials, or the specific time at which the broadcast began. For example, in some markets, the broadcast may begin exactly on the hour, while in other markets, the broadcast may be delayed until five minutes after the hour due to and of a number of reasons, such as an extended newscast prior to the broadcast. If the specific broadcast market can be determined, that information could be utilized by the language processing system to better anchor the integration between the broadcast and the shouted-out answer analysis, such as potentially changing the dialect that is used as a default in analyzing spoken words, or to assist in marketing the "right" products to that specific market. It might be somewhat strange, for example, for an individual to be offered a product that is otherwise unavailable in that local market. Or, it might enhance that individual's experience to offer products that are only available locally, to convey a sense of comfort and familiarity to that individual. In other ways, the individual's interaction with the language processing system can be improved when the system knows what is being broadcast in a specific market at a specific time, and that can be determined by utilizing the voice-controlled electronic device to listen for spoken words from the broadcast. If the broadcast moves to a locally-based commercial (versus a nationally-based commercial) for paper towels, and the user shouts-out "Order that," the language processing system would not have enough information to fulfill the request without the context provided by the mark-up accompanying the broadcast. With that context established, the language processing system could then simply add paper towels to the individual's shopping cart and place the order.

In some embodiments, the language processing system can listen to the background audio while tracking the mark-up files so that the system can better filter out sounds and spoken words that cannot be relevant to the broadcast. For example, if the pending question asked during the broadcast of Game Show was: "Who is the father of the United States?" and the language processing system hears the utterance "pick up your toys," the system can ignore the utterance as not being related to United States presidents.

In some embodiments, the voice-controlled electronic device and the speaker(s) being used for the broadcast may be two entirely separate devices (from completely unrelated companies with no interaction or connectivity between them). It should also be noted that while the description herein may refer to "spoken words," the "voice-controlled" electronic device, as described herein, may instead correspond to any device capable of being activated in response to detection of a specific "word" (e.g., a word, a phoneme, a phrase or grouping of words, or any other type of sound, or any series of temporally related sounds). For example, a voice activated electronic device is one type of sound controlled electronic device. In response to determining that a wakeword has been uttered, the voice activated electronic device may, in some embodiments, send the audio data representing a spoken utterance subsequently following the wakeword to a speech-processing system for processing and analyzing the audio data. The speech-processing system may then generate and send a response to the voice-controlled electronic device, as well as, or alternatively, communicate with one or more additional systems for obtaining content to be rendered by the voice activated electronic device, and/or may cause one or more additional electronic devices to output content and/or perform a particular action (e.g., turn on a light, play a song, etc.). Additionally, the voice-controlled electronic device may store one or more wakewords within its local memory. If a determination is made that audio data received from the audio input devices (e.g., microphones) matches the wakeword, the voice activated electronic device may begin sending audio data representing some or all of the audio captured by the voice activated electronic device to the speech-processing system.

For some broadcasts, the shouted-out responses from the individual may be sounds instead of words that are recognized by the system that was itself "customized" by the specific skill to enhance the user's experience. For example, if the user has invoked a pro football skill and is watching a pro football game, each time the sound-activated electronic device hears what is recognized as a painful gasp utterance, the system could offer to provide a picture-in-picture replay of what likely was an impact play on the field (such as a receiver catching a ball while in the air and having his legs taken out from under him before coming he lands, so that he smashes to the ground—which causes the individual watching to yell out "uggghhhh! !! !"). In some other instances, skills may be automatically invoked, in which case the language processing system would adjust the way it processed and analyzed incoming words in accordance with the automatically invoked skill. For example, if an individual utilizes a game show skill for the Wheel of Fortune and has selected auto-enablement in the skill preferences for that skill, the Wheel of Fortune skill could be automatically enabled based on the time of the regularly scheduled broadcast (in which case the language processing system could send a signal to the electronic device to enter listening mode and remain in Wheel of Fortune skill mode only if local audio signals are processed that indicate that Wheel of Fortune is being watched), or the system could cause a message to be sent to the individual asking for confirmation to automatically switch to Wheel of Fortune mode, or a variety of other ways (such as, for example, the language processing system being independently aware that the individual is watching Wheel of Fortune and, based on the presence of the Wheel of Fortune skill in the individual's account profile, auto-invoking the skill).

In some embodiments, the content creator or distributor may provide a mark-up of the content that is to be or is being broadcast to highlight particular aspects of the broadcast. Under such circumstances, there could be very specific audio signals broadcast periodically that could be otherwise inaudible to the individual that could be used to synchronize the broadcast with the mark-up. This could be used to make it easier for an individual to join the broadcast in an interactive way even if the broadcast has already begun. Alternatively, the language processing system may be able to listen in on the broadcast to provide the synchronization by recognizing specific broadcast events within the broadcast itself, even though such recognition may take additional processing and time to accomplish.

In some embodiments, invoking a broadcast-based skill can alter the way the voice/sound-activated electrical device operates. For example, during normal operations, the voice-controlled electronic device is always operational and can be processing audio data to determine whether a "wakeword" is recognized. Once a wakeword is recognized, the device takes the audio signals starting around the time the the wakeword was recognized and sends them to the language processing system for further analysis. When a response is provided back to the electronic device, the channel between the device and the language processing system can be routinely closed. When a broadcast skill is invoked and installed, however, the voice-controlled electronic device changes mode into a constantly listening mode during the entire broadcast, so that any shouted-out answers are received by the device without having to start with a wakeword. Similarly, the device needs to continuously listen to the background audio to try and synchronize the individual's interactive experience with the broadcast itself without the broadcast having to start with a wakeword.

In some embodiments, listening mode may be invoked automatically (as described above through automatically invoking a skill), or manually such as by pressing and holding a push-to-talk switch on an electronic device (such as a voice controlled remote control device), or other such methods. Listening mode may listen for utterances related to the broadcast from either the individual or from the device playing the content and ignore all other sounds, or listening mode may also retain a wakeword listening feature to accommodate commands that may not be related to the broadcast and invoked skill. For example, if the language processing system was being used by one individual in a house to control the operation of a robotic vacuum, and a second individual invoked the Wheel of Fortune skill which caused the electronic device to enter listening mode, the wakeword listening feature could remain active for additional commands related to the continued operation of the vacuum.

In some embodiments, the local electronic device may be utilized to listen for utterances from the individual related to the content being broadcast and the skill invoked, where those utterances can be sent to the language processing system for analysis, processing, and appropriate responses. In other embodiments, some of that analysis and processing may be resident on the local electronic device which can enable that device to filter which utterances get sent to the language processing system (for example, the electronic device might be set to just send utterances related to the content being broadcast for analysis, and to ignore all other utterances). In other embodiments, additional functionality may be resident on the local electronic device, whereby the language processing system could download time relevant portions of mark-up data during the broadcast for analysis and response locally to reduce potential bandwidth and throughput issues between the local electronic device and the language processing system.

As described above and below, the term "utterance" may correspond to a spoken word, statement, or sound. In some embodiments, an utterance may include the wakeword followed by an invocation, such as a request, question, or command. In this particular instance, the utterance may begin with the wakeword being spoken, and may end when a last word, phoneme, or sound is spoken. For example, an utterance may correspond to the question, "Alexa—What is the weather currently like?" As another example, an utterance may be, "Alexa—Play my workout music," or "Alexa—Buy that." Further still, an utterance, which need not include the wakeword, may be, "Turn up the volume" or "Call mom."

FIG. 1A is an illustrative diagram of an exemplary system for utilizing a voice-controlled electronic device to enable individuals to interact with broadcast entertainment content, in accordance with various embodiments. In the non-limiting embodiment, a first electronic device 10 may display broadcast content 12 on its display screen. Broadcast content 12 may, for instance, be a pre-recorded game show in which a host asks three contestants questions to test their knowledge on a wide variety of subjects. For example, broadcast content 12 may correspond to any number of popular game shows such as Jeopardy, Family Feud, $100,000 Pyramid, etc. Broadcast content 12 may, instead, relate to live-broadcast events such as reality television, award shows, political speeches, sporting events (like college, amateur or professional events, including baseball, football, basketball, hockey, soccer games, Olympic events, or other sports), etc.

The content creator and/or distributor of the broadcast material may provide the content to be broadcast from a particular location, such as a cloud-based content storage facility 14 (in the case of pre-recorded content). In order for the broadcast to occur, the content would be provided through one or more know distribution channels 16, such that the content ends up being displayed on device 10. When the content is broadcast, program audio and speech 18 are produced that can be used to provide contextual cues 20 to a language processing system (see FIGS. 1B and 2) via network 230. The content creator and/or distributor may also provide program data 28 associated with the program being broadcast, which can be requested by the language processing system via network 230. The program data can include a variety of things, such as mark-up data that relates to specific events in the broadcast, a timeline of the broadcast including where the mark-up data occurs on that timeline, etc. The "timeline" can be an actual timeline of what happens and when in a given broadcast, or the "timeline" can instead be based on a specific time and events can be synchronized off of that time (such as when mark-up data for the third question occurs as broadcast start-time plus 6 minutes). For example, mark-up data may include each of the questions that are being asked in a given game show, as well as the appropriate answers and a series of alternate acceptable answers. Voice-controlled electronic device 100 can signal the language processing system (see FIGS. 1B and 2) to get the program data and send interactions with individual 2 via wireless communication link 26 to network 230 (to which the language processing system is connected). The mark-up data may also be embedded within the broadcast and/or be provided via a separate and independent connection to the language processing system, based on knowledge that the individual is watching the content. In addition, in some embodiments, first electronic device 10 and voice-controlled electronic device 100 may, in fact, be a single electronic device, such as a voice-controlled television, voice-controlled video display, voice-controlled audio-player (for audio-only broadcasts), voice-controlled computer, etc.

In some embodiments, an individual 2 may invoke a skill related to the broadcast that the individual is about to watch, such as invocation 3 "Alexa, let's play GAMESHOW," which starts interaction 22 with voice-controlled electronic device 100. Responses 24 from electronic device 100 can include, but are not limited to, positive encouragement, commercial offers for products, etc., as is described in more detail below. Once a broadcast skill (such as the GAMESHOW skill) has been installed and is running, operation of voice-controlled electronic device 100 changes modes from essentially listening for wakewords to listening for everything related to the broadcast. For example, broadcast 12 may correspond to a specific game show in which a host asks three contestants questions (as shown in the illustration on device 10). While the broadcast is occurring, voice-controlled electronic device 100 operates in broadcast skill mode constantly listening for shouted-out answers 33 from individual 2 and for the audio content of the broadcast playing on device 10 (both of which are described in more detail below). At the highest level, device 100 listens for answers from individual 2 and sends those answers to the language processing system for analysis and responses, while it also listens for audio cues from the broadcast itself to assist in syncing the user's experience with the actual broadcast. In addition, if, for example, the individual is playing back a recorded broadcast of a game show and the individual elects to pause the playback, the entire system can recognize that the playback is paused and remain on hold until playback begins again (e.g., because device 100 would, in that case, hear no broadcast audio and thus assume the broadcast is paused or stopped).

FIG. 1B is an illustrative diagram of an exemplary system for interacting with the system of FIG. 1A to perform a first action based on spoken words, in accordance with various embodiments. In the non-limiting embodiment, an individual 2 may speak utterance 4 that can be captured by microphone(s) on voice-controlled electronic device 100, assuming that a broadcast-type skill has already been installed and is operational, which caused device 100 to switch from wakeword detection mode to a constant listening mode. For instance, in response to the broadcast asking the question: "Who was the first president of the United States?," individual 2 may shout out "George Washington!" In response to recording the shouted out utterance 4, voice-controlled electronic device 100 may package and send digital audio data representing utterance 4 to language processing system 200 via network 230. Language processing system 200 may then be configured to perform exemplary process 150, which may begin at step 152.

At step 152, first audio data representing utterance 4 (i.e., the shouted-out answer) may be received. At step 154, an account identifier associated with electronic device 100 may be received. In some embodiments, the account identifier may be sent as metadata appended to the first audio data, however this is merely illustrative. The account identifier may indicate a particular account on language processing system 200 that electronic device 100 is associated with. In some embodiments, electronic device 100 may send a device identifier (e.g., a MAC address, a serial number, IP address, etc.) to language processing system 200, which in turn may be used to identify an account identifier.

At step 156, an account on language processing system 200 may be determined based on the account identifier associated with voice activated electronic device 100. For instance, electronic device 100 may be associated with an account of language processing system 200. The account may include a first language model specific to the account that may be customized to understand words and phrases spoken by individuals. The account may also indicate other devices/systems that individual 2 may interact with/control using electronic device 100 and language processing system 200. In this instance, information may be obtained from the user account regarding the individual's prior interaction with the invoked skill, such as obtaining the individual's scores from playing the invoked game show for the current month.

At step 158, first text data representing the first audio data may be generated. Upon receipt, the first audio data may be provided to an automatic speech recognition ("ASR") system capable of performing automatic speech recognition processing. The ASR system, as described in greater detail below with reference to FIG. 2A, may perform speech-to-text processing to the first audio data to generate first text data representing the first audio data. At step 160, an intent of the utterance may be determined to be associated with a first application. After the first text data is generated, the text data may be provided to a natural language understanding ("NLU") system to perform NLU processing to the text data. The NLU processing may use the language model(s) associated with the user account in an attempt to determine an intent of utterance 4. For example, the NLU system may parse the text data into grammatical objects to determine the portions of the utterance associated with nouns, verbs, prepositions, etc. After this occurs, the grammatical objects may be used to generate a ranked list of intent hypothesis that the utterance may correspond to. The NLU system may determine one or more domains, which may also be referred to as categories that may be capable of handling the intent of the utterance. In this instance, because a broadcast skill has been invoked, the NLU system is adjusted to account for the fact that there is no wakeword, and that individual words may be acceptable inputs that correspond to proposed answers to questions occurring on the broadcast. In some embodiments, the NLU system may determine that the intent of utterance 4 is for answering a question from the broadcast (e.g., {Intent}: "George Washington"), where the particular skill/application to be used in response to that utterance (e.g., {Skill/Application}: "GAMESHOW skill") is the GAMESHOW skill which includes mark-up data of the episode's questions and acceptable answers.

At step 164, account identifier data, the first text data, and the intent associated with the first utterance may be sent to first skill system 140. First skill 140 can determine whether the shouted out answer was correct or incorrect, and adjust the individual's score accordingly. As described in more detail above and below, language processing system 200 can track the progress of the broadcast so that when it receives utterance 4 (in this case "George Washington"), it can compare the utterance with the previously obtained correct answer, as well as any acceptable alternatives. System 200 can prepare a response to eventually be played back to the individual depending on skill or individual settings and preferences. For example, system 200 can simply acknowledge receipt of the shouted out answer as shown in FIG. 1B by response 6 stating "OK." Alternatively, the response could be more exciting, especially if the individual got the answer right, stating "Correct! Way to go!" or something of the like.

In the illustrative non-limiting embodiment, language processing system 200, in response to identifying the intent of utterance 4 is associated with a first skill 140. For example, first skill 140 may correspond generally to a broadcast skill, or it can correspond to a particular broadcast skill, such as the GAMESHOW skill. First skill 140 may be configured to perform exemplary process 170. Process 170, for instance, may begin at step 172. At step 172, the account identifier data, the first text data, and the intent associated with utterance 4 may be received by first skill 140.

At step 174, first skill 140 may determine whether the current broadcast is pre-recorded or live. If skill 140 determines that the current broadcast is pre-recorded, a request for data content or mark-up data is made in step 176. If the content of the broadcast is not pre-recorded, skill 140 may go straight to monitoring the progress of the content for the occurrence of events in the broadcast. Alternatively, step 174 could be skipped and replaced with step 176, whereby a request is made for mark-up data regardless of whether the broadcast is pre-recorded or not. In the instance where the broadcast is live so that many events are unknown (such as, for example, which team will score and when in the sporting event), there may, nonetheless, be a wide variety of mark-up data available, such as the site of the live event, names of participants, etc.

At step 178, the progress of the broadcast is monitors for the occurrence of events to which the individual may have shouted-out answers. When those events occur, such as asking "Who is the first president of the United States?", the question and appropriate answers are provided to language processing system 200 in order to prepare an appropriate response to individual 2. The data from the broadcast and events in the broadcast can be provided to language processing system in step 180. This description is merely illustrative. Additional steps may be included, such as various steps described above or below in connection with one or more embodiments disclosed herein. Moreover, language processing system 200 may rely on skill system 140 to determine whether the shouted-out answer from individual 2 is correct or incorrect, and for skill system 140 to provide corresponding notification data to language processing system 200, so that an appropriate response can be prepared for individual 2. In that case, in step 180, data could be provided to language processing system 200 that indicates whether individual 2 got the answer correct or not.

Language processing system 200, in one embodiment, may further be configured to perform exemplary process 190, which may begin at step 192. At step 192, notification data may be received. For instance, the notification data generated and sent by first skill system 140 may be received by language processing system 200. In response to receiving the notification data, the functionality associated with the first skill may determine an action to be performed by language processing system 200. At step 194, second text data representing a response using first skill's functionality may be determined. In response to receiving the notification data, language processing system 200 may determine text data representing a sample response to use to indicate that first skill system 140 has evaluated the shouted-out answer from individual 2.

At step 196, second audio data may be generated. Language processing system 200 may, for instance, include a text-to-speech ("TTS") system. Upon the second text data being determined, the TTS system may be provided with the second text data, and may perform text-to-speech processing to the second text data to generate second audio data representing the second text data. At step 198, the second audio data may be sent to the requesting device. For example, the second audio data may be sent to voice activated electronic device 100, which in turn may output response 6—"Ok"—to indicate to individual 2 that utterance 4 has been processed, and that an action associated with the utterance is occurring. If language processing system 200 is configured to determine whether the shouted-out answer is correct, the notification data received in step 192 can include each acceptable answer. If, on the other hand, skill system 140 is configured to make that determination, then the notification data received in step 192 can simply be an indication of whether the answer was correct or incorrect.

Figure 2:
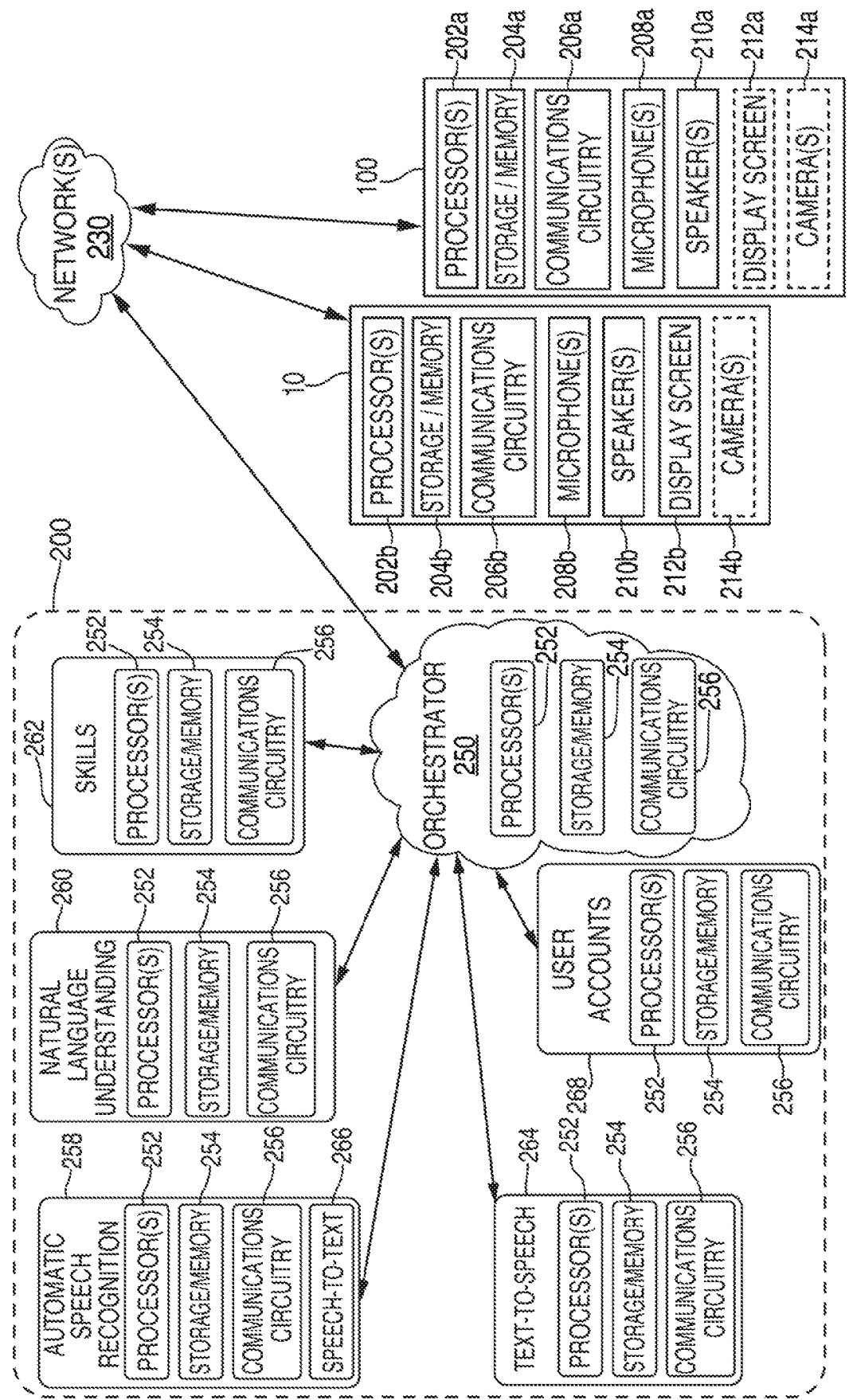
FIG. 2 is an illustrative diagram of the system architecture of FIGS. 1A and 1B, in accordance with various embodiments.

FIG. 2 is an illustrative diagram of the system architecture of FIGS. 1A and 1B, in accordance with various embodiments. In particular, FIG. 2 may include electronic device 10, as described in FIG. 1A, and electronic device 100, as described in FIG. 1B, which may both be capable of communicating with language processing system 200 using network(s) 230.

Electronic device 100 may, in some embodiments, include sound controlled functionality, such as one or more voice and/or sound activated components. In some embodiments, electronic device 100 may be configured to communicate with language processing system 200 in response to detecting an utterance including a wakeword, which may subsequently be followed by a request/question/statement. Similarly, electronic device 100 may alternatively or additionally include one or more manually activated components for manually activating electronic device 100. In this particular scenario, electronic device 100 may also be configured, in one embodiment, to communicate with language processing system 200 in response to a manual input being detected by one or more input mechanisms, such as a touch screen, a button, and/or a switch, for example.

In a non-limiting embodiment, electronic device 100 may be capable of being activated in response to detecting a specific sound, such as a wakeword, as well as, or alternatively, via one or more inputs. After detecting a specific sound (e.g., a wakeword or trigger expression), electronic device 100 may recognize commands (e.g., audible commands, inputs) within captured audio, and may perform one or more actions in response to the received commands. Furthermore, electronic device 100 may also be configured to perform one or more actions in response to detecting a particular touch, or mechanical, input(s) via electronic device 100. For example, electronic device 100 may be capable of being activated in response to a wakeword prior to a broadcast skill being invoked. Once a broadcast-type skill is invoked, electronic device 100 may switch modes to become a constantly listening device during the time the broadcast is occurring. Once the broadcast has concluded, the switched mode can expire and device 100 can return to wakeword monitoring mode.

Electronic device 100 may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), and/or smart accessories (e.g., light bulbs, light switches, electrical switches, etc.). In some embodiments, electronic device 100 may be relatively simple or basic in structure such that no, or a minimal number of, mechanical input option(s) (e.g., keyboard, mouse, track pad) or touch input(s) (e.g., touch screen, buttons) are included. For example, electronic device 100 may be able to receive and output audio, and may include power, processing capabilities, storage/memory capabilities, and communication capabilities. However, in other embodiments, electronic device 100 may include one or more components for receiving mechanical inputs or touch inputs, such as a touch screen and/or one or more buttons.

Electronic device 100, in one embodiment, may include a minimal number of input mechanisms (e.g., a power on/off switch) such that functionality of electronic device 100 may solely or primarily be through audio input and audio output. For example, electronic device 100 may include, or be in communication with, one or more microphones that listen for a wakeword by continually monitoring local audio. In response to the wakeword being detected, electronic device 100 may establish a connection with language processing system 200, send audio data to language processing system 200, and await/receive a response from language processing system 200. In some embodiments, however, non-voice/sound activated devices may also communicate with language processing system 200. For example, in response to a button or touch screen being pressed, or a button or touch screen being pressed and held, a microphone associated with electronic device 100 may begin recording local audio, establish a connection with language processing system 200, send audio data representing the captured audio to language processing system 200, and await/receive a response, and/or action to be occur, from language processing system 200.

Language processing system 200 may be located within a dedicated computing device or computing system, which may or may not be in communication with one or more additional devices. For instance, language processing system 200 may be located on a remote computing system with which an individual subscribes to a service on. However, language processing system 200 may also be included within a computing system locally stored or owned by an individual.

Electronic device 100 may include one or more processors 202a, storage/memory 204a, communications circuitry 206a, one or more microphones 208a or other audio input devices (e.g., transducers), one or more speakers 210a or other audio output devices, a display screen 212a, and one or more cameras 214a or other image capturing components. However, one or more additional components may be included within electronic device 100, and/or one or more components may be omitted. For example, electronic device 100 may also include a power supply or a bus connector. As still yet another example, electronic device 100 may include one or more additional input and/or output mechanisms, such as one or more buttons, or one or more switches or knobs. Furthermore, while electronic device 100 may include multiple instances of one or more components, for simplicity only one of each component has been shown.

In some embodiments, electronic device 100 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In one embodiment, electronic device 100 may be in communication with an additional processing device including one or more of: processor(s) 202a, storage/memory 204a, communications circuitry 206a, microphone(s) 208a, speaker(s) 210a, display screen 212a, and/or camera(s) 214a. For example, a centralized control device of electronic device 100 may include one or more microphone(s) 208a. These microphone(s) 208a may receive audio input signals, and electronic device may determine whether or not the audio input signals indicate that a wakeword was uttered. If so, then electronic device may cause audio data representing an utterance including the wakeword, or spoken after the wakeword. To be sent to language processing system 200.

Electronic device 10, in the illustrative embodiment, may be substantially similar to electronic device 100, provided that electronic device 10 is capable of receiving broadcast transmissions of content. Electronic device 10, for instance, may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), and/or smart accessories (e.g., light bulbs, light switches, electrical switches, etc.). In some embodiments, electronic device 10 may be relatively simple or basic in structure such that no, or a minimal number of, mechanical input option(s) (e.g., keyboard, mouse, track pad) or touch input(s) (e.g., touch screen, buttons) are included. For example, electronic device 10 may be able to receive and output audio, and may include power, processing capabilities, storage/memory capabilities, and communication capabilities. However, in other embodiments, electronic device 10 may include one or more components for receiving mechanical inputs or touch inputs, such as a touch screen and/or one or more buttons. In one embodiment, electronic device 10 may correspond to a sound controlled electronic device (e.g., a voice activated electronic device) and electronic device 10 may correspond to a non-sound controlled electronic device (e.g., a smartphone, tablet, laptop, etc.).

Electronic device 10 may further include one or more processors 202b, storage/memory 204b, communications circuitry 206b, one or more microphones 208b, speaker(s) 210b, a display screen 212b, and one or more cameras 214b. In some embodiments, electronic device 10 may include substantially similar capabilities as that of electronic device 100. However, in one embodiment, electronic device 10 may include display screen 212b as opposed to display screen 212a being optional, as is the case with electronic device 100. The aforementioned is merely exemplary.

Processor(s) 202a and 202b, which may be referred to herein collectively as processor(s) 202, may include any suitable processing circuitry capable of controlling operations and functionality of electronic device(s) 10 and/or 100, as well as facilitating communications between various components within electronic device(s) 10 and/or 100. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("AS SPs"), system-on-chip systems ("SOCs"), and/or complex programmable logic devices ("CPLDs"). Furthermore, each of processor(s) 202 may include its own local memory, which may store program systems, program data, and/or one or more operating systems. However, processor(s) 202 may run an operating system ("OS") for electronic device(s) 10 and/or 100, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by electronic device(s) 10 and/or 100.

Storage/memory 204a and 204b, which may be referred to herein collectively as storage/memory 204, may include one or more types of storage mediums such as any volatile or non-volatile memory, or any removable or non-removable memory implemented in any suitable manner to store data for electronic device(s) 10 and/or 100. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include a media system, which may be configured to facilitate communications between electronic device(s) 10 and/or 100 and language processing system 200. For example, the media system may store one or more communications protocols that may be executed by processor(s) 202 for facilitating communications for electronic device(s) 10 and/or 100. In some embodiments, a sessions initiation protocol ("SIP") may be used to facilitate media transfer between electronic device(s) 10 and/or 100 and one or more of language processing system 200 and another instance of electronic device(s) 10 and/or 100. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for electronic device(s) 10 and/or 100. In some embodiments, a Web Real-Time Communications ("WebRTC") protocols may be employed by electronic device(s) 10 and/or 100. In a non-limiting embodiment, the media system may include instructions that indicate which communications protocols to employ for facilitating media transfer between devices based on a device type of electronic device(s) 10 and/or 100. For example, if electronic device(s) 10 and/or 100 does not include display 212 and/or camera 214, then the media system may indicate that PJSIP should be used, whereas if electronic device(s) 10 and/or 100 include(s) display 212 and/or camera 214 then the media system may indicate that WebRTC protocols should be used.

In some embodiments, storage/memory 204 may include one or more systems and/or databases, such as a speech recognition system, a wakeword database, a sound profile database, and a wakeword detection system. The speech recognition system may, for example, include an automatic speech recognition ("ASR") component that recognizes human speech in detected audio. The speech recognition system may also include a natural language understanding ("NLU") component that determines user intent based on the detected audio. Also included within the speech recognition system may be a text-to-speech ("TTS") component capable of converting text to speech to be outputted by speaker(s) 210, and/or a speech-to-text ("STT") component capable of converting received audio signals into text to be sent to speech-processing system for processing.

The wakeword database may be a database stored locally by storage/memory 204 of electronic device(s) 10 and/or 100, and may include a list of a current wakeword for electronic device(s) 10 and/or 100, as well as one or more previously used, or alternative, wakewords for electronic device(s) 10 and/or 100. In some embodiments, an individual may set or program a wakeword for their electronic device(s) 10 and/or 100. The wakeword may be programmed directly on electronic device(s) 10 and/or 100, or a wakeword or wakewords may be set by the individual via a local client application that is in communication with language processing system 200. For example, an individual may use their mobile device having the speech-processing system application running thereon to set the wakeword. The specific wakeword may then be communicated from the mobile device to language processing system 200, which in turn may send/notify electronic device(s) 10 and/or 100 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device(s) 10 and/or 100. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An MINI model represents a word as a series of states. Generally, a portion of an audio signal is analyzed by comparing its MINI model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device(s) 10 and/or 100 may then begin transmitting the audio signal to language processing system 200 for detecting and responds to subsequent utterances made by an individual.

In some embodiments, storage/memory 204 may store voice biometric data associated with one or more individuals. For example, an individual that operates electronic device(s) 10 and/or 100 may have a registered user account on language processing system 200 (e.g., within accounts system 268). In some embodiments, electronic device(s) 10 and/or 100 may be associated with a group account, and various individuals may have user accounts that are operating under the rules and configurations of the group account. As an illustrative example, electronic device(s) 10 and/or 100 may be associated with a first group account on language processing system 200, the first group account being for a family that lives at a household where electronic device(s) 10 and/or 100 is located. Each family member may also have a user account that is linked to the first group account (e.g., a parent, a child, etc.), and therefore each user account may obtain some or all of the rights of the first group account. For example, electronic device(s) 10 and/or 100 may have a first group account on language processing system 200 registered to a particular family or group, and each of the parents and children of the family may have their own user account registered under the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice.

Communications circuitry 206a and 206b, which may be referred to herein collectively as communications circuitry 206, may include any circuitry allowing or enabling one or more components of electronic device(s) 10 and/or 100 to communicate with one another, and/or with one or more additional devices, servers, and/or systems. For example, communications circuitry 206 may facilitate communications between electronic device(s) 10 and/or 100 and language processing system 200. As an illustrative example, audio data representing an utterance (e.g., utterance 4 of FIG. 1B) may be transmitted over a network 230, such as the Internet, to language processing system 200 using any number of communications protocols. For example, network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device(s) 10 and/or 100 and language processing system 200. In some embodiments, electronic device(s) 10 and/or 100 and language processing system 200 may communicate with one another via a web browser using HTTP. Various additional communication protocols may be used to facilitate communications between electronic device(s) 10 and/or 100 and language processing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, Bit-Torrent, FTP, RTP, RTSP, SSH, and/or VOIP.

Communications circuitry 206 may use any communications protocol, such as any of the previously mentioned exemplary communications protocols. In some embodiments, electronic device(s) 10 and/or 100 may include one or more antennas to facilitate wireless communications with a network using various wireless technologies (e.g., Wi-Fi, Bluetooth, radiofrequency, etc.). In yet another embodiment, electronic device(s) 10 and/or 100 may include one or more universal serial bus ("USB") ports, one or more Ethernet or broadband ports, and/or any other type of hardwire access port so that communications circuitry 206 allows electronic device(s) 10 and/or 100 to communicate with one or more communications networks.

Electronic device(s) 10 and/or 100 may also include one or more microphones 208a and/or 208b, which may be referred to herein collectively as microphone(s) 208, and/or transducers. Furthermore, one or more microphones located within a separate device may be in communication with electronic device(s) 10 and/or 100 to capture sounds for electronic device(s) 10 and/or 100. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device(s) 10 and/or 100 may include multiple microphones (e.g., four, seven, ten, etc.) placed at various positions about electronic device(s) 10 and/or 100 to monitor/capture any audio outputted in the environment where electronic device(s) 10 and/or 100 is located. The various microphones 208 may include some microphones optimized for distant sounds, while some microphones may be optimized for sounds occurring within a close range of electronic device(s) 10 and/or 100. In some embodiments, microphone(s) 208 may only begin to detect audio signals in response to a manual input to electronic device(s) 10 and/or 100. For example, a manually activated device may begin to capture audio data using microphone(s) 208 in response to a user input, such as pressing a button, tapping a touch screen, or providing any touch input gesture to a touch input component.

Electronic device(s) 10 and/or 100 may include one or more speakers 210a and/or 210b, which may be referred to herein collectively as speaker(s) 210. Furthermore, electronic device(s) 10 and/or 100 may be in communication with one or more speaker(s) 210. Speaker(s) 210 may correspond to any suitable mechanism for outputting audio signals. For example, speaker(s) 210 may include one or more speaker units, speaker housings, transducers, arrays of speakers, and/or arrays of transducers that may be capable of broadcasting audio signals and or audio content to a surrounding area where electronic device(s) 10 and/or 100 may be located. In some embodiments, speaker(s) 210 may include headphones or ear buds, which may be wirelessly wired, or hard-wired, to electronic device(s) 10 and/or 100, that may be capable of broadcasting audio directly to an individual.

In some embodiments, one or more microphones 208 may serve as input devices to receive audio inputs. Electronic device(s) 10 and/or 100, in the previously mentioned embodiment, may then also include one or more speakers 210 to output audible responses. In this manner, electronic device(s) 10 and/or 100 may function solely through speech or audio, without the use or need for any input mechanisms or displays, however this is merely exemplary.

Display screen(s) 212a and/or 212b, which may be referred to herein collectively as display screen(s) 212, may correspond to a display device and/or touch screen, which may be any size and/or shape and may be located at any portion of electronic device(s) 10 and/or 100. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 212 may correspond to a projected capacitive touch ("PCT"), screen include one or more row traces and/or driving line traces, as well as one or more column traces and/or sensing lines. In some embodiments, display screen 212 may be an optional component for electronic device(s) 10 and/or 100. For instance, electronic device(s) 10 and/or 100 may not include display screen 212. Such devices, sometimes referred to as "headless" devices, may output audio, or may be in communication with a display device for outputting viewable content.

Display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 212, a capacitance between the object and the conductive material may be formed. Processor(s) 202 may be capable of determining a location of the touch screen associated with where the capacitance change is detected, and may register a touch input as occurring at that location.

In some embodiments, display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. One or more additional layers, or spaces between layers, may be included. Furthermore, any suitable number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. Processor(s) 202 of electronic device(s) 10 and/or 100 may be configured to determine which pixels are associated with a particular location point, and which item or items are also displayed at that pixel location. Furthermore, electronic device(s) 10 and/or 100 may be configured to cause one or more additional actions to occur to the item or items being displayed on display screen 212 based on a temporal duration the touch input, and or if one or more additional touch inputs are detected. For example, an object that contacted display screen 212 at a first location may be determined, at a later point in time, to contact display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 100, and therefore the fewer driving lines and/or sensing lines used, the smaller the amount of power that is needed to operate the touch screen display.

In some embodiments, display screen 212 may correspond to a high-definition ("HD") display. For example, display screen 212 may display images and/or videos of 720p, 1080p, 1080i, or any other image resolution. In these particular scenarios, display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, the aforementioned display ratios and pixel numbers are merely exemplary, and any suitable display resolution or pixel number may be employed for display screen 212, such as non-HD displays, 4K displays, and/or ultra displays.

In some embodiments, electronic device(s) 10 and/or 100 may include one or more cameras 214*a* and/or 214*b*, which may be referred to herein collectively as camera(s) 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device(s) 10 and/or 100 may include multiple cameras 214, such as one or more front-facing cameras and/or one or more rear facing cameras. Furthermore, camera(s) 214 may be configured to recognize far-field imagery (e.g., objects located at a large distance away from electronic device(s) 10 and/or 100) or near-filed imagery (e.g., objected located at a relatively small distance from electronic device(s) 10 and/or 100). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device(s) 10 and/or 100. For instance, camera(s) 214 may be external to, and in communication with, electronic device(s) 10 and/or 100. For example, an external camera may be capable of capturing images and/or video, which may then be provided to electronic device(s) 10 and/or 100 for viewing and/or processing.

In some embodiments, display screen 212*a* and/or camera(s) 214*a* may be optional for electronic device 100. For instance, electronic device 100 may function using audio inputs, and outputting audio in response or causing one or more actions to occur in response, and therefore display screen 212*b* and/or camera(s) 214*b* may not be included. Furthermore, in some embodiments, electronic device 100 may not include display screen 212*b* and/or camera(s) 214*b*, but instead may be in communication with display screen 212*b* and/or camera(s) 214*b*. For example, electronic device 100 may be connected to a display screen via a Wi-Fi (e.g., 802.11 protocol) connection such that visual content sent to electronic device 100 may be sent to the display screen, and output thereby. Similarly, camera(s) 214*b* may be optional for electronic device 10, and the previous description regarding camera(s) 214*a* may apply.

In one exemplary embodiment, electronic device(s) 10 and/or 100 may include an additional input/output ("I/O") interface. For example, electronic device(s) 10 and/or 100 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device(s) 10 and/or 100 may include one or more lights, light emitting diodes ("LEDs"), or other visual indicator(s). In some embodiments, one or more features of the output portion of the I/O interface may be included in a purely voice activated version of electronic device(s) 10 and/or 100. For example, one or more LED lights may be included on electronic device(s) 10 and/or 100 such that, when microphone(s) 208 receive audio, the one or more LED lights become illuminated signifying that audio has been received by electronic device(s) 10 and/or 100. In some embodiments, one or more vibrating mechanisms or other haptic features may be included with electronic device(s) 10 and/or 100 to provide a haptic response to an individual.

In some embodiments, electronic device(s) 10 and/or 100 may include radio-frequency identification ("RFID") functionality and/or near field communication ("NFC") functionality. Furthermore, in some embodiments, electronic device(s) 10 and/or 100 may include one or more infrared ("IR") sensors and one or more IR emitters. The IR sensors/emitters may be used to determine depth information. For example, in one embodiment, a distance of an individual from electronic device(s) 10 and/or 100 may be determined using the one or more IR sensors/emitters. Depth determination may be performed using any depth determination technique. In some embodiments, a distance between an individual and electronic device(s) 10 and/or 100 may be employed as a basis for presenting content with varying density using display screen 212. In some embodiments, electronic device(s) 10 and/or 100 may include beaconing functionality that allows electronic device(s) 10 and/or 100 to recognize when one or more devices are located nearby. For example, electronic device(s) 10 and/or 100 may include beaconing detection functionality that generates a beaconing signal, and attempts to determine whether any devices nearby are capable of detecting that signal. If so, then that may indicate that a particular device is proximate to electronic device(s) 10 and/or 100.

In some embodiments, contextual metadata may be obtained by computer vision analysis of an object detected by camera(s) 214. For example, in response to speaking the utterance, "Buy this," electronic device(s) 10 and/or 100 may cause camera(s) 214 to capture an image. That image may be analyzed to determine what the object is, and the contextual metadata associated with that objects identify may be determined. For instance, if an individual is holding up a bottle of ketchup, then the computer vision analysis may be able to determine a product name, bar code, and/or any other attribute about the bottle of ketchup from the captured image, and may populate a contextual metadata structure indicating the determined values (e.g., 'Item Name' slot: "Ketchup").

Language processing system 200 may include various components and modules including, but not limited to, automatic speech recognition ("ASR") system 258, natural language understanding ("NLU") system 260, applications/skills system 262, text-to-speech ("TTS") module 264, and user accounts system 268. In some embodiments, language processing system 200 may also include an orchestrator system 250 capable of orchestrating one or more processes to be performed by one or more of ASR system 258, NLU system 260, applications/skills system 262, TTS system 264, and/or user accounts system 268, as well as one or more additional components, devices, and/or systems associated therewith. Language processing system 200 may also include computer readable media, including, but not limited to, flash memory, random access memory ("RAM"), and/or read-only memory ("ROM"). Language processing system 200 may also include various modules that store software, hardware, logic, instructions, and/or commands for language processing system 200, such as a speaker identification ("ID") module, or any other module, or any combination thereof.

ASR system 258 may be configured to recognize human speech in detected audio, such as audio captured by electronic device 100, which may then be transmitted to language processing system 200. ASR system 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. Furthermore, in some embodiments, ASR system 258 may include speech-to-text ("STT") system 266. STT system 266 may employ various speech-to-text techniques. Any suitable computer implemented speech to text technique may be used to convert the received audio signal(s) into text, such as SOFTSOUND speech processing technologies available from the Autonomy Corporation, which is headquartered in Cambridge, England, United Kingdom.

ASR system 258 may include an expression detector that analyzes audio signals received by language processing system 200, such as the expression detector mentioned above with regards to electronic device 100 (and/or electronic device 10). Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that a particular word or phrase (e.g., a wake-word), is represented within the audio signal. The expression detector may then compare that score to a threshold value to determine whether that word or phrase will be declared as having been spoken.

For instance, ASR system 258 may transcribe received audio data into text data representing the words of the speech contained in the audio data using STT system 266. The text data may then be used by other components for various purposes, such as executing system commands, inputting data, etc. ASR system 258 may then interpret an utterance based on the similarity between the utterance and pre-established language models stored in an ASR model knowledge base of storage/memory 254. For example, the input audio data may be compared with models for sounds (e.g., sub-word units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, ASR system 258 may output the most likely text recognized in the audio data. ASR system 258 may also output multiple hypotheses in the form of a lattice or an N-best list with each hypothesis corresponding to a confidence score or other score (such as probability scores, etc.).

ASR system 258 may further attempt to match received feature vectors to language phonemes and words as known in acoustic models and language models stored within storage/memory 254 of ASR system 258. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, application enablement/disablement, shopping, etc.

ASR system 258 may generate results in the form of a single textual representation of the speech, an N-best list including multiple hypotheses and respective scores, and/or lattice, for example, which may be sent to NLU system 260 for processing, such as conversion of the text into commands for execution, either by electronic device 100, language processing system 200, or by another device, such as a separate device or server capable of performing one or more additional functionalities thereon (e.g., a television capable of outputting video content).

Generally, NLU system 260 takes textual input and attempts to make a semantic interpretation of the text. That is, NLU system 260 may be configured to determine a meaning of text based on the individual words and then implements that meaning. In some embodiments, NLU system 260 may interpret a text string to derive an intent or a desired action of the utterance (e.g., utterance 4) as well as the pertinent pieces of information in the text that allow an action to be completed. For example, if a spoken utterance is processed by ASR system 258 and outputs the text, "call mom," NLU system 260 may determine that an intent of the utterance is to activate a telephone, or telephone functionality, and to initiate a call with a contact matching the entity "mom". In some embodiments, NLU system 260 may process several textual inputs related to the same utterance. For example, if ASR system 258 outputs N text segments (as part of an N-best list), then NLU system 260 may process all N outputs.

As will be discussed further below, NLU system 260 may be configured to parse and tag annotated text. For example, for the text "call mom," "call" may be tagged as a command (e.g., a command to execute a phone call), and "mom" may be tagged as a specific entity and target of the command (e.g., a telephone number for the entity corresponding to "mom" stored in a contact list). Further, NLU system 260 may be used to provide answer data in response to queries, for example using a knowledge base stored within storage/memory 254 of NLU system 260 and/or storage/memory of language processing system 200.

To correctly perform natural language understanding processing of speech input, NLU system 260 may be configured to determine a domain of an utterance. By determining the domain, NLU system 260 may narrow down which services and functionalities offered by an endpoint device (e.g., electronic device(s) 10 and/or 100, language processing system 200, or any other electronic device or system) may be relevant. For example, an endpoint device may offer services relating to interactions with a telephone service, a contact list service, a calendar/scheduling service, a music player service, etc. As another example, an endpoint device may enable certain services or functionalities for an individual having a user account of language processing system 200. Words in a single text query may implicate more than one service, and some services may be functionally linked (e.g., both a telephone service and a calendar service may utilize data from the contact list).

In one embodiment, orchestrator 250 may be configured to receive the audio data, and may determine that the notification has also been received. Orchestrator 250 may determine whether or not the notification indicates that there is (or was) content displayed by display screen 212 at the time that the utterance was spoken (e.g., when the wakeword was uttered). However, the determination of whether content is being displayed by display screen 212 may correspond to a time just prior to the wakeword being uttered, when the wakeword was uttered, after the wakeword was uttered, during the utterance being spoken, after the utterance was spoken, and/or after the audio data is sent to language processing system 200, and the aforementioned is merely exemplary. The notification may correspond to a flag, such as a logical I/O, where if the flag has a value of 1, then this may indicate that content is being rendered by electronic device 100, whereas if the flag has a value of 0, then this may indicate that not content is being rendered by electronic device(s) 10 and/or 100.

Upon determining that electronic device(s) 10 and/or 100 is rendering content (e.g., receiving a notification indicating that content is being displayed by display screen 212), orchestrator 250 may generate and send a request to the various domains associated with skills system 262 and NLU system 260. The request may inquire as to which domain, or domains, are currently providing electronic device(s) 10 and/or 100 with content, such as the content being rendered. Upon determining that domain, or domains, that are providing content, orchestrator 250 may request that the identified domain(s) generate and send contextual metadata representing text corresponding to the displayed content. After receiving the contextual metadata from the corresponding domain(s), orchestrator 250 may cause the contextual metadata to be sent to NLU system 260. For example, in some of the present embodiments, the system may select a broadcast domain that provides the broadcast data.

In some embodiments, the various domains may include formatting logic (e.g., speechlets) that may format the contextual metadata. The contextual metadata may be structured, in response to the formatting logic applying its formatting rules, such that attributes of the content are arranged in contextual slots including values associated with those slots. For instance, the contextual metadata may also be referred to, or may generally correspond to, entity data representing content being displayed by display screen 212 an utterance is spoken. For example, single item or detail web page of an item, such as a coffee maker, may include entity data organized into contextual slots such as {Item Name}, {List Position}, and {Item Identifier}. Values from the particular web page being displayed currently by display screen 212 may include: {Item Name}: "Coffee Maker," {List Position}: "1," and {Item Identifier}: "abcd1234." Different types of content may include different contextual slots. For example, lists may include {List Types}, {List Position}, {List Name}, etc.

In one non-limiting, illustrative embodiment, NLU system 260 may store prompts module including a listing of responses, arranged by a prompt identifier and its corresponding text data representation of a response. When a response is needed to be provided to a requesting device, such as electronic device(s) 10 and/or 100, NLU module 260 polls each domain to determine which domain should likely handle providing the response. Each domain may provide one or more prompt identifiers which correspond to a best response, and NLU module selects the prompt identifier having the highest ranking. For example, similarly to how NLU module 260 determined which domain can handle a particular application, NLU module 260 may also determine scores of LOW, MEDIUM, or HIGH, indicating the likelihood that a particular domain can handle the particular response. However, a particular prompt may be selected using any other suitable technique, and the aforementioned is merely exemplary.

Each prompt identifier may be associated with a particular response, and therefore the text data representing the particular response, such that when a prompt is selected to be used, NLU system 260 is capable of determining that the selected prompt corresponds to a particular response, and the text data representing that response may be provided to TTS system 264, which in turn may generate audio data representing that text data. That audio data, then, may be sent to the requesting device (e.g., electronic device(s) 10 and/or 100), such that an audio message of that response may be output by the requesting device. NLU system 260 may send text data corresponding to a prompt that is associated with a prompt identifier to TTS system 264. For example, text data representing the response, "Ok. {Application Name} is now {Enablement Status}," may be sent to TTS system 264. NLU system 260 may further send the slot results for slot data {Application Name} and slot data {Enablement Status} to TTS system 264, such that the framework of the selected response is formulated, and the text data representing the response may be used to generate audio data. For example, if {Application Name}: Skill 1, and {Enablement Status}: Enabled, then the response would be, "Ok. 'Skill 1' is enabled."

Various other prompts may be included. For example, NLU system 260 may include prompts 1, 2, 3, 4, 5, 6 . . . L, where L is any number greater than zero (e.g., L>0). Similarly, for however many prompts are included, there may be an associated response. For example, the responses with slots may respectively include, but are not limited to, "{Confirmation Status}. {Application Name} is now {Enablement Status}."; "Ok. {Application Name} is {Enablement Status}."; "Do you want to {Enablement Intent} {Application Name}?"; "I found {Number of Matches} application corresponding to {Object Identifier}. Which one did you mean?"; and "I'm sorry. I could not find any applications have the name {Object Identifier}."

In some embodiments, text data representing a response may be generated by language processing system 200. For instance, NLU system 260 and/or applications/skills system 262 may be employed to determine contextual features of a response to be generated, and may generate the corresponding text data representing that response. The text data may then be provided to TTS system 264, which may generate audio data representing the text data, which may then be sent to the requesting device.

When an skill of skills system 262 is enabled for a particular account of language processing system 200, a language model associated with that account may be updated to include functionality associated with that skill. This may correspond to generating an updated language model for the user account. The updated language model may update a language model for the user account such that it now includes invocation phrase text data representing one or more invocation phrases that may be added to the individual's language model stored by their user account such that the one or more invocation phrases may be used for invoking the application. Furthermore, sample utterance text data representing one or more sample utterance templates, including slot data corresponding to one or more slots, fields, or placeholders may be added to the language model such the updated language module is capable of determining whether an additional utterance has a same format of one of the sample utterance templates for that application. Additionally, sample response text data representing one or more sample response templates, including response slot data representing one or more response slots, fields, or placeholders, may be added to the individual's language model such that the updated language model is capable of selecting one of the sample response templates to use for responding to a subsequent utterance associated with that application. Still further, the updated language model may include additional slot data representing one or more slot, field, or placeholder values for the application, to be used with one of the application response slots, fields, or placeholders.

Skills system 262 may, for example, correspond to various action specific applications, which are capable of processing various task specific actions and/or performing various functionalities. Skills system 262 may further correspond to first party applications and/or third party applications capable of performing various tasks or actions, or performing various functionalities. For example, based on the context of the audio received from electronic device(s) 10 and/or 100, language processing system 200 may use a certain application to generate a response, or to obtain response information, which in turn may be communicated back to electronic device(s) 10 and/or 100 and/or to another electronic device (e.g., a television). Skills system 262 may also include processor(s) 252, storage/memory 254, and communications circuitry 256.

In some embodiments, a skill of skills system 262 may be written in various computer languages, such as JavaScript and Java. Various applications may include an intent schema file and a sample utterances file, such as, for example, IntentSchema.json including the JSON defining the intents of a particular application, and a SampleUtterances.txt including plain text sample utterances for the particular application. Applications may also include application specific code, such as a JavaScript or Java file, common library code, and various other JavaScript or Java modules.

TTS system 264 may employ various text-to-speech techniques. In some embodiments any technique for transcribing speech may be suitable for computer implemented speech to text, such as SOFTSOUND speech processing technologies available from the Autonomy Corporation, which is headquartered in Cambridge, England, United Kingdom. TTS system 264 may also include processor(s) 252, storage/memory 254, and communications circuitry 256.

User accounts system 268 may store one or more user accounts or user profiles, corresponding to users having an account on language processing system 200. For example, a parent may have an account registered on language processing system 200, and each of the parent's children may have their own user profile registered under the parent's account. Information, settings, and/or preferences, for example, for each user profile may be stored by user accounts system 268. In some embodiments, user accounts system 268 may store a voice signal, such as voice biometric information, for a specific user profile. This may allow speaker identification techniques to be used to match a voice to voice biometric data associated with a specific user profile. In some embodiments, user accounts system 268 may store a telephone number assigned to a particular user profile. In some embodiments, user accounts system 268 may include a list of media items currently stored within an individual's registered account or user profile. For example, a list of music or videos purchased or obtained by an individual may be stored within the individual's user profile on user accounts system 268, which may be accessed by the individual when the individual seeks to hear a particular song or songs, or view a particular video or videos. User accounts system 268 may also include a listing of all applications currently enabled for each user profile. In some embodiments, NLU system 260 may receive indications of which applications are currently enabled for a particular user profile or account, such that NLU system 260 is aware of which rules and capabilities that language processing system 200 is able to perform for the particular user profile or account.

Orchestrator 250, in a non-limiting embodiment, may correspond to any suitable device, system, and/or logic capable of performing one or more processes. For example, orchestrator 250 may be configured to request contextual metadata from one or more domains/applications of skills system 262 in response to receive a notification from electronic device 100 that content is currently being rendered thereby. In response to receiving the contextual metadata, orchestrator 250 may be configured to provide the contextual metadata to NLU system 260. In one embodiment, orchestrator 250 may include processor(s) 252, storage/memory 254, and communications circuitry 256.

Although each of ASR system 258, NLU system 260, skills system 262, TTS system 264, user accounts system 268, and orchestrator 250 may each include instances of processor(s) 252, storage/memory 254, and communications circuitry 256, and those instances of processor(s) 252, storage/memory 254, and communications circuitry 256 within each of ASR system 258, NLU system 260, skills system 262, TTS system 264, user accounts system 268, and orchestrator 250 may differ. For example, the structure, functionality, and style of processor(s) 252 within ASR system 258 may be substantially similar to the structure, functionality, and style of processor(s) 252 within NLU system 260, however the actual processor(s) 252 need not be the same entity.

Figure 3A:
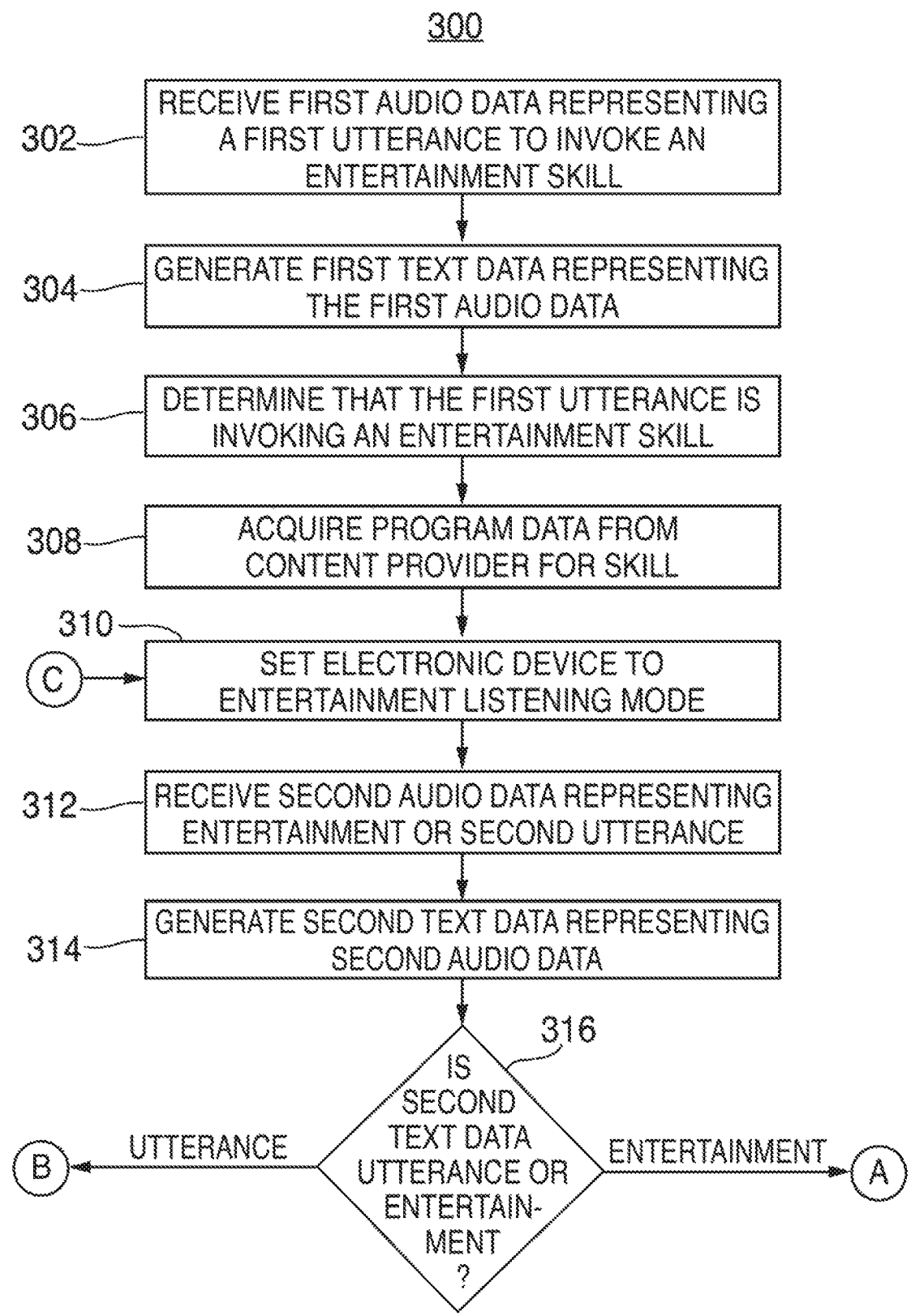
FIGS. 3A-3C are illustrative flowcharts of an exemplary process to enable individuals to interact with broadcast entertainment using spoken words that are analyzed by a language processing system, in accordance with various embodiments.
Figure 3B:
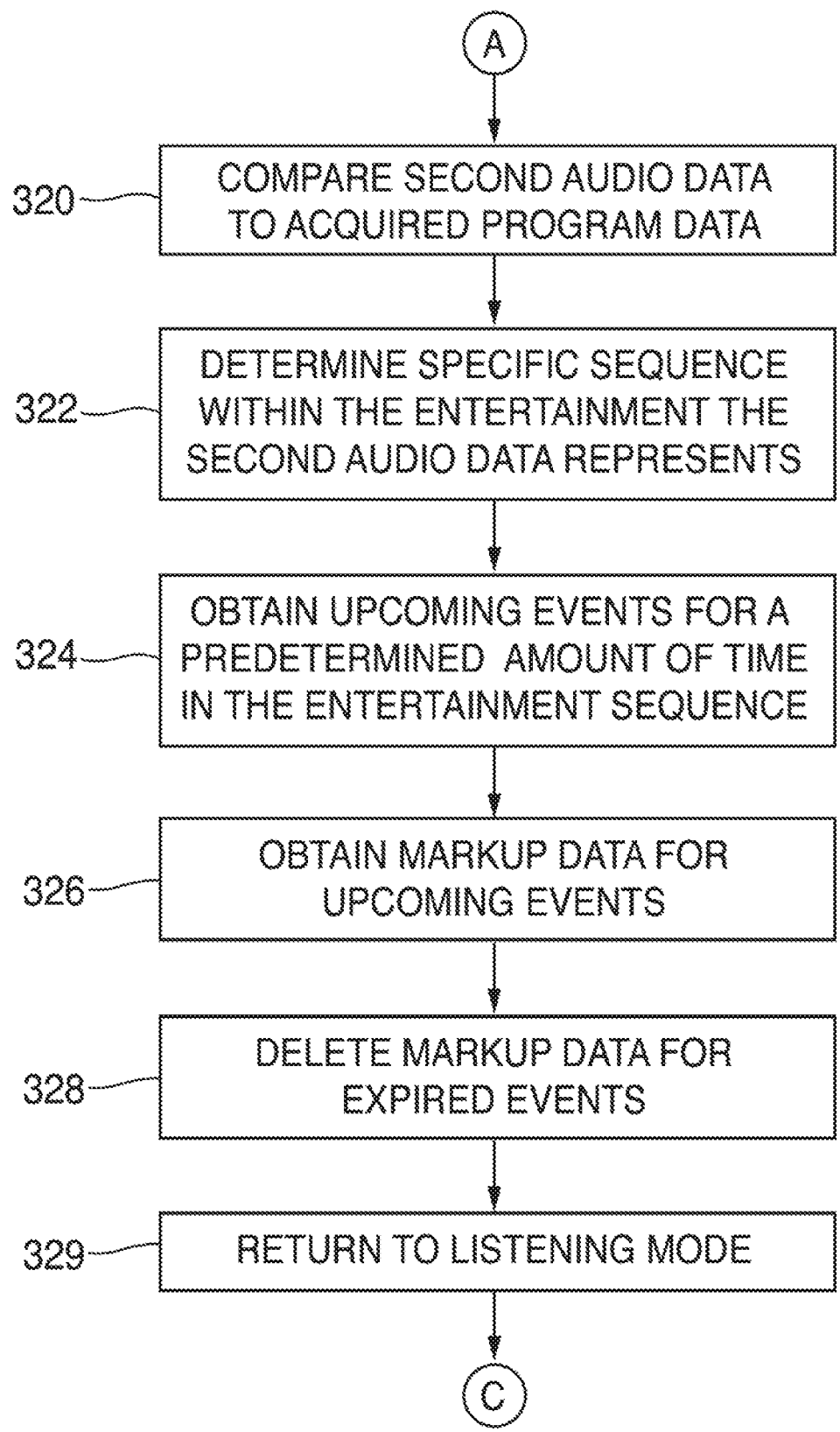
Figure 3C:
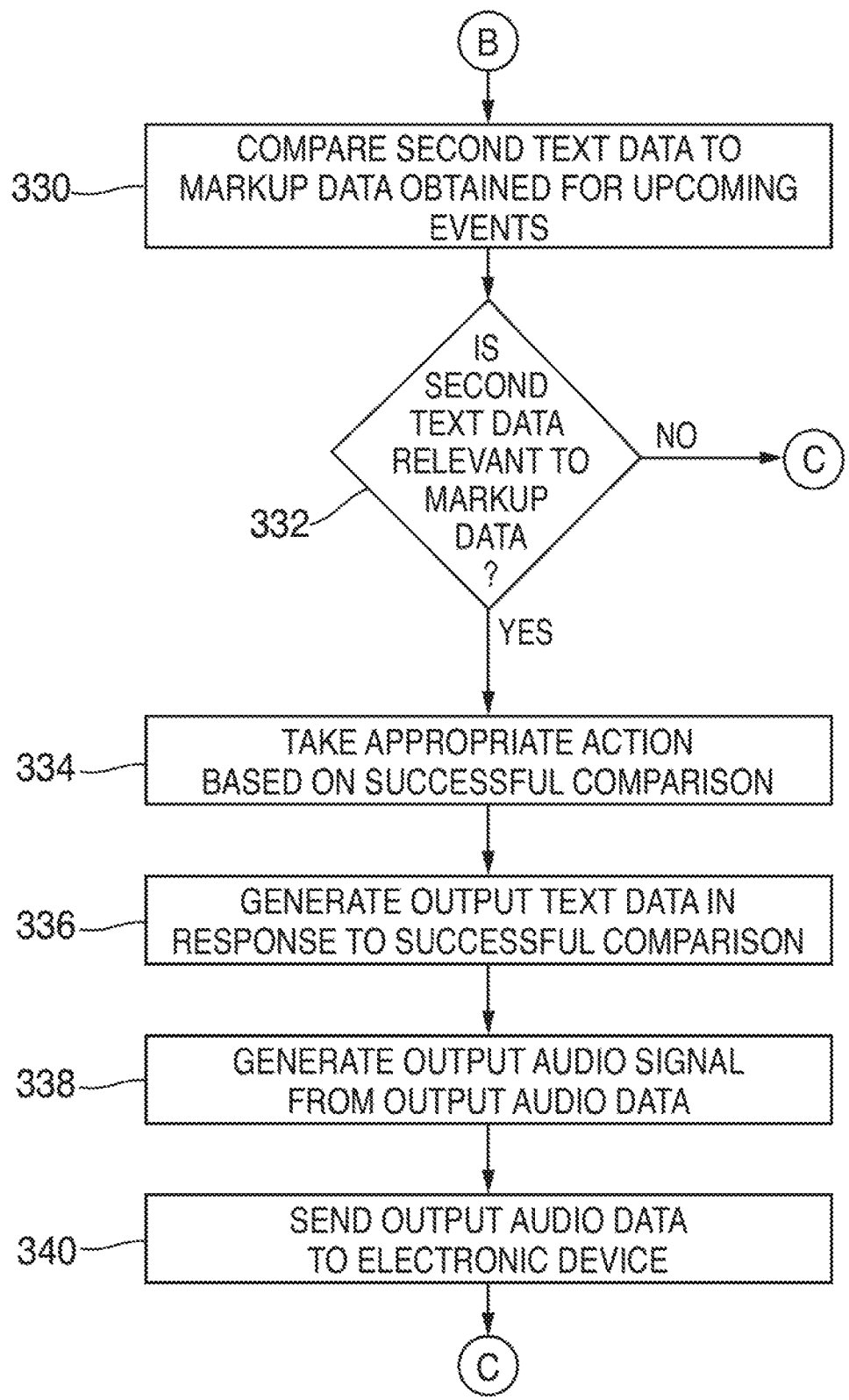

FIGS. 3A-3C are illustrative flowcharts of an exemplary process to enable individuals to interact with broadcast entertainment using spoken words that are analyzed by a language processing system, in accordance with various embodiments. FIG. 3A in particular shows a first portion of process 300, which may, in a non-limiting embodiment, begin at step 302. At step 302, a language processing system receives first audio data representing a first utterance to invoke an entertainment/broadcast skill from a voice-controlled electronic device. Prior to this utterance being received, the voice-controlled generally operates in a wake-word detection mode in which the device constantly analyzes sounds it inputs seeking a match with a high degree of confidence that a wakeword has been uttered. Once the invocation sub-process completes and the skill is loaded, the electronic device switches modes and operates in a constant listening mode regardless of whether a wakeword is uttered again (until the broadcast is completed or terminated prematurely).

At step 304, language processing system generates first text data representing the first audio data. The text data can be generated by, for example, ASR 258, which analyzes the received digital audio data and determines words contained in that audio data. The output of ASR, at step 306, can be received for analysis by a process or system that attempts to determine the meaning of the words. For example, ASR 258 can pass the words it produced to NLU module 260, which analyzes the words in order to determine the context and meaning. At step 306, the NLU module can determine whether the first utterance is invoking an entertainment/broadcast skill, and language processing system 200 can begin the process to invoke the skill. In addition, at step 308, language processing system 200 can request and acquire program data and/or mark-up data from the content provider or distributor associated with the broadcast that is being initiated. For example, if the invoked skill is for GAME-SHOW, the program data may include a timing profile of the broadcast and a series of event mark-up data representing each question that is asked, the appropriate correct answers to those questions, and the timing of the questions and answers relative to the timing profile. At step 310, the invocation process continues by setting the voice-controlled device to broadcast mode, which can be accomplished by language processing system 200 sending an appropriate command to the voice-controlled device to switch modes.

Voice-controlled device 100 is thus switched to always-listening broadcast mode, and the broadcast of entertainment content commences. At step 312, language processing system 200 receives second audio data that can represent a second utterance from the individual, or it can represent audio data from the entertainment broadcast, or it can represent something else entirely. As described above, once electronic device 100 has been placed in listening/broadcast mode, device 100 "listens" to all audio data it can acquire through its microphone(s), and it is not known when sound is recorded by device 100 and passed to language processing system 200, what the sound represents. At step 314, the audio data received from electronic device 100 is passed to a module such as ASR 258, which converts the received audio data into text data using techniques such as the ASR techniques previously described. The portion of the process set forth in FIG. 3A concludes at step 316, in which the generated text data is analyzed by techniques such as NLU 260 in order to determine whether the second audio data represents an utterance from the individual, or whether it represents audio signals from the broadcast itself that were acquired locally at the site of the individual. If it is determined that the second audio data represents the broadcast entertainment, the process continues at the steps shown in FIG. 3B. Otherwise, the process continues at the steps shown in FIG. 3C.

FIG. 3B shows the portion of process 300 that may occur in the event that the acquired second audio data is determined to be entertainment broadcast data. At step 320, the second audio data can be compared to the appropriate program data that was acquired in step 308. Step 320 may, in some instances, be performed within language processing system 200, and in other instances, may be performed by the invoked skill, based on the timing of the broadcast as related to the timing profile that may also have been acquired at step 308. At step 322, a determination of the current location within the timeline of the broadcast is made, based on what is represented by the second audio data. At step 324, a limited number of upcoming events are obtained, based on the timing sequence that was determined in step 322. This information/data may be limited in order to maintain performance at or below latency limits. For example, if all of the program data was downloaded and needed to be search each and every time, latencies could build up in the processes which could severely degrade the performance characteristics of the integrated entertainment broadcast skill, and potentially result in a dissatisfied user experience. Accordingly, it may be beneficial to provide a limited amount of forward looking mark-up data, such as, for example, ten seconds of future mark-up data, which would grow stale after a limited time. For example, mark-up data could be placed into a FIFO queue having the capability to store on the order of ten seconds of digital mark-up data. The limited amount of mark-up data provided at any time limits the amount of analysis that must be performed on incoming representations of audio signals to insure that latency limits are not exceeded. To that end, at step 328, mark-up events that have already expired are deleted a given amount of time after they expire, such as, for example, one second. After the expired mark-up data is deleted, at step 329, voice-controlled electronic device 100 return to listening mode as shown by transfer node C, which directs the process back to step 310 on FIG. 3A.

FIG. 3C shows the other path that can be followed at the end of the sub-process shown in FIG. 3A. In step 330, the second text data that was produced by ASR 258 can be compared to one or more mark-up events from the mark-up data acquired in step 326. This comparison can be accomplished by, in some instances, language processing system 200, and in other instances by the invoked skill. In either instance, at step 332, a determination is made as to whether the second text data obtained from ASR is relevant to the mark-up data. In other words, is the text data an appropriate answer to the question asked in the broadcast; and appropriate is intended to mean that "answer" in the second text data is a reasonable answer, even though it may not necessarily be the correct answer. If the comparison results in a determination that the second text data is not relevant to the question asked, the process is again returned to FIG. 3A at step 310 to enter listening mode again. If the comparison results in an affirmative result, at step 334, appropriate action is taken based on the successful comparison. The appropriate action could include the creation of a message intended to let the individual know of the success. For example, at step 334, a message could be created or selected from a pre-existing set of speechlets, such as: "That's the correct answer!" At step 336, the selected message could be generated as output text data, and the output text data could be turned into an output analog audio signal through techniques such as TTS 264. At step 340, language processing system 200 sends the output audio signal to electronic device 100, and then returns to listening mode at step 310.

Process 300, as shown and described in FIGS. 3A-3C is merely illustrative of techniques that can be utilized in accordance with at least some of the embodiments disclosed herein. For example, additional steps could be provided once the game being broadcast has been completed to inform the individual of his/her current game status as compared to other family members. The resultant output message could be produced in pieces to try to avoid introducing unnecessary latency into the system. For example, a final message could be produced stating "You scored _AA_ points today and are now _BB_ points ahead of your brother—great job!" in that example, all of the text except _AA_ and _BB_ could be pre-recorded speechlets, so that the system need only process the number of points scored today and the point differential in order to proceed. Moreover, once the broadcast concludes, or is terminate prematurely, a signal can be sent to voice-controlled electronic device 100 to return to wakeword detection mode.

Figure 4:
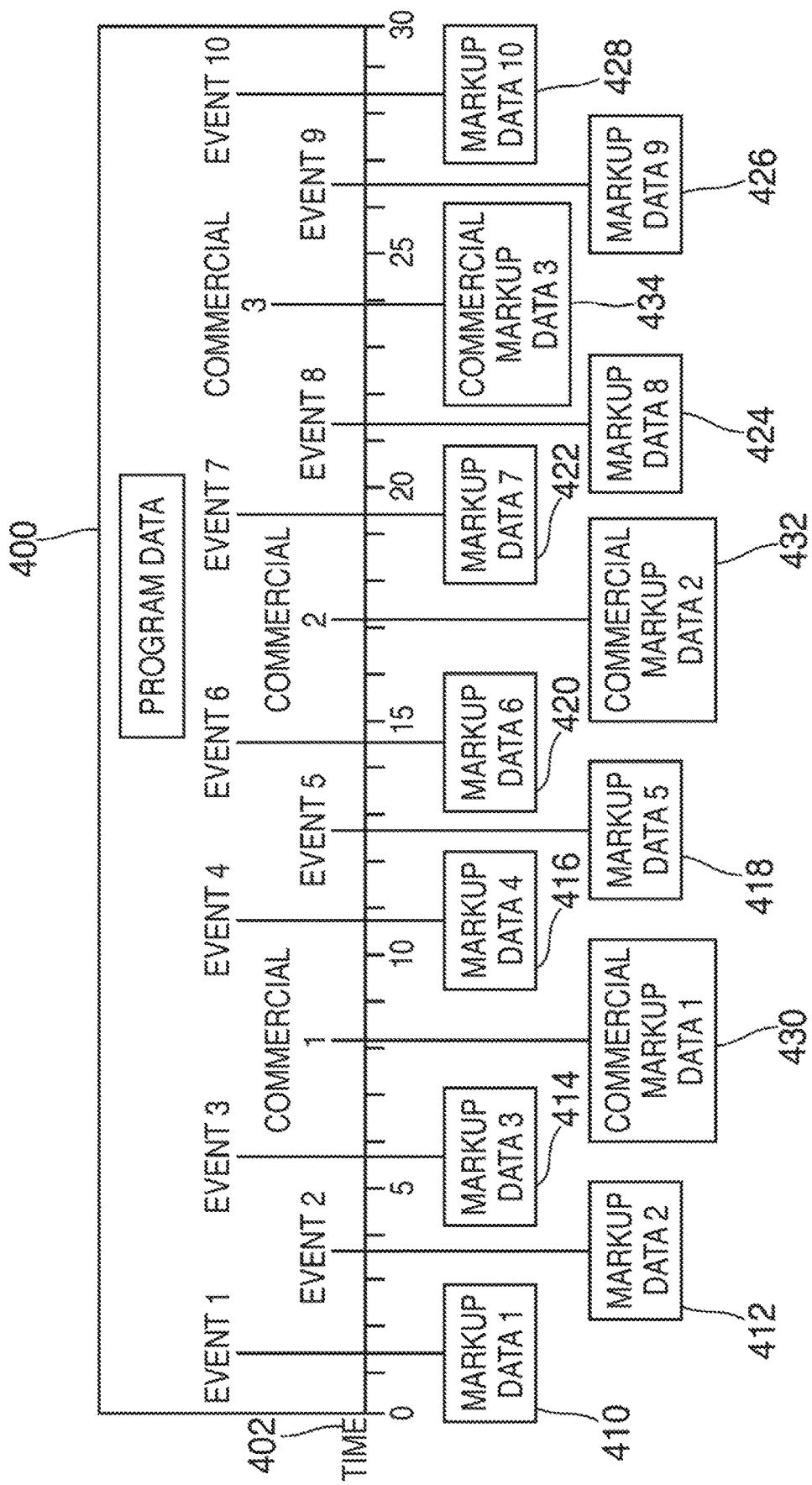
FIG. 4 is a schematic diagram of an illustrative example of program data that can be utilized to enhance the experience of an individual watching broadcast entertainment utilizing spoken words, in accordance with various embodiments.

FIG. 4 is a schematic diagram of an illustrative example of program data that can be utilized to enhance the experience of an individual watching broadcast entertainment utilizing spoken words, in accordance with various embodiments. FIG. 4 shows program data 400 that can be used in connection with a broadcast of a game show in which ten questions are asked over a thirty-minute period of time, which is indicated by timeline 402. Each one of the questions that is to be asked during the broadcast is represented by a mark-up data slot that is populated with the question to be asked, as well as a series of answers that would be considered to be correct. In addition, an additional set of mark-up data can be provided that coincides with commercials that are broadcast during the entertainment broadcast. For example, question mark-up data 410, 412, 414, 416, 418, 420, 422, 424, 426, and 428, each contain a single question and acceptable answers, and each of those mark-up data are aligned with a particular point in the timeline of the broadcast 402 corresponding to the time in the broadcast that the question is asked by the system. Similarly, the commercial mark-up data 430, 432, and 434, also represent commercials that are intended to be broadcast, each at a particular time during the broadcast. In this regard, however, one or more of the commercial mark-up data could simply be an instruction to provide a certain amount of local advertising time for insertion of one or more local ads. For example, commercial mark-up data 1 (430) and 3 (434), could be national or regional ads that are sold to nationwide companies, and that must accompany the broadcast of the entertainment content. Commercial mark-up data 2 (423), however, may just be a placeholder to reserve a certain amount of space during the broadcast for insertion of a local ad, such as an advertisement for the local late-night news team that reports from 11:00 pm to 11:30 each night. The question mark-up data could be used by the processes described above to creat an immersive integrated entertainment experience for an individual, such that the individual can essentially participate in the broadcast from his or her own living room. When the individual believes they know the answer to question 3, they can simply shout-out the answer and the systems described herein will end up comparing that answer to what is stored in mark-up data 3 (414). In that manner, the individual can participate in as much of the broadcast as desired, and the individual can jump in during the middle of the broadcast if they are unable to attend the broadcast from the beginning. In that instance, voice-controlled electronic device 100 would observe sounds from somewhere in the middle of the broadcast, and correlate those sounds in order to determine where in the timeline the broadcast currently is. Once that location has been established and synchronized, the individual can then begin shouting out answers that would then be compared with the appropriate mark-up data.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method, comprising:
    receiving first audio data representing audio outputted by a first device associated with a display and captured by a voice-controlled device;
    determining that the first audio data represents a first portion of content being broadcasted via the first device, the first portion corresponding to a question;
    receiving second audio data representing an utterance spoken by a user and captured by the voice-controlled device;
    determining that the utterance is in response to the first portion of the content being broadcasted via the first device;
    processing the second audio data and the first audio data to determine a response to the utterance; and
    generating output data corresponding to the response.

2. The method of claim 1, further comprising:
receiving a first skill identifier indicating a first skill functionality related to content to be displayed via the first device, wherein the content is interactive content;
determining from the first skill functionality that the voice-controlled device is to operate in a listening mode;
causing the voice-controlled device to activate in the listening mode by:
generating a control message to switch the voice-controlled device from a wakeword detection mode to the listening mode; and
sending the control message to the voice-controlled device enabling the voice-controlled device to capture the first audio data and the second audio data without detecting a wakeword.

3. The method of claim 1, further comprising:
receiving background audio data representing the content being displayed via the first device;
receiving time synchronization data related to the content that identifies timing of events during broadcast;
processing the background audio data, using automatic speech recognition (ASR), to determine background text data;
processing, using natural language understanding (NLU), the background text data to determine that the background text data matches a second portion of the content being displayed via the first device; and
determining, using the time synchronization data and the second portion of the content, a location within the content that is being broadcast.

4. The method of claim 1, further comprising:
receiving mark-up data corresponding to the content;
determining that the content is being broadcast live;
receiving supplemental mark-up data during broadcast of the content;
determining updated mark-up data by updating the mark-up data with the supplemental mark-up data; and
wherein processing the second audio data and the first audio data further comprises processing the second audio data, the first audio data and the updated mark-up data to determine the response.

5. The method of claim 1, further comprising:
receiving commercial mark-up data associated with commercials that have yet to be broadcast during the broadcast of the content;
receiving third audio data representing an input received by the voice-controlled device;
processing the third audio data and the commercial mark-up data to determine that the third audio data is a request to make a purchase associated with the commercial mark-up data;
generating text data to confirm the request to make a purchase;
generating purchase audio data using text-to-speech (TTS) techniques and the text data; and
sending the purchase audio data to the voice-controlled device for playback.

6. The method of claim 1, further comprising:
associating a first user account with the content;
retrieving, from the first user account, first user account data related to the content;
determining updated first user account data by updating the first user account data after broadcast of the content is complete;
generating user account text data based on the updated first user account data;
applying text-to-speech (TTS) techniques to the user account text data to create user account audio data; and
sending the user account audio data to the voice-controlled device for playback.

7. The method of claim 6, further comprising:
determining other user account data related to the content;
comparing the other user account data to the first user account data;
determining status of the user associated with the first user account data as compared with other users associated with the other user account data;
determining text data to report a comparison of the user with the other users;
converting the text data to status audio data using TTS techniques; and
sending the status audio data to the voice-controlled device for playback.

8. The method of claim 1, further comprising:
receiving third audio data captured by the voice-controlled device;
determining that the third audio data represents a second utterance spoken by the user;
processing the third audio data using automatic speech recognition (ASR) to determine input text data;
processing the input text data using natural language understanding (NLU) to determine an intent associated with the second utterance;
determining, based on the intent, that the second utterance is unrelated to the content being displayed via the first device; and
generating second output data corresponding to the intent.

9. The method of claim 1, further comprising:
receiving a first portion of data corresponding to the content to be broadcasted;
determining, using the first audio data, that the first portion of the data expired; and
receiving, in response to the first portion of the data having expired, a second portion of the data corresponding to the content,
wherein processing the second audio data and the first audio data further comprises processing the second audio data, the first audio data and the second portion of the data to determine the response.

10. The method of claim 1, further comprising:
receiving input audio data representing a wakeword followed by a second utterance;
process, using automatic speech recognition (ASR), the input audio data to determine input text data;
process the input text data to determine that a wakeword is present;
process the input text data to determine intent of the second utterance; and
generate second output data corresponding to the intent, the second output data being unrelated to the content being displayed via the first device.

11. A language processing system, comprising:
memory;
communications circuitry; and
at least one processor operable to:
receive first audio data representing audio outputted by a first device associated with a display and captured by a voice-controlled device;
determine that the first audio data represents a first portion of content being broadcasted via the first device, the first portion corresponding to a question;

receive second audio data representing an utterance spoken by a user and captured by the voice-controlled device;

determine that the utterance was in response to the first portion of the content being broadcasted via the first device;

process the second audio data and the first audio data to determine a response to the utterance; and generate output data corresponding to the response.

12. The language processing system of claim 11, wherein the at least one processor is further operable to:

receive a first skill identifier indicating a first skill functionality related to content to be displayed via the first device, wherein the content is interactive content;

determine from the first skill functionality that the voice-controlled device is to operate in a listening mode;

generate a control message to switch the voice-controlled device from a wakeword detection mode to the listening mode; and send the control message to the voice-controlled device enabling the voice-controlled device to capture the first audio data and the second audio data without detecting a wakeword.

13. The language processing system of claim 11, wherein the at least one processor is further operable to:

receive background audio data representing the content being displayed the first device;

receive time synchronization data related to the content that identifies timing of events during broadcast;

process the background audio data, using automatic speech recognition (ASR), to determine background text data;

process, using natural language understanding (NLU), the background text data to determine that the background text data matches a second portion of the content being displayed via the first device; and determine, using the time synchronization data and the second portion of the content, a location within the content that is being broadcast.

14. The language processing system of claim 11, wherein the at least one processor is further operable to:

receive mark-up data corresponding to the content;

determine that the content is being broadcast live;

receive supplemental mark-up data during broadcast of the content;

determine updated mark-up data by updating the mark-up data with the supplemental mark-up data; and process the second audio data, the first audio data and the updated mark-up data to determine the response.

15. The language processing system of claim 11, wherein the at least one processor is further operable to:

receive commercial mark-up data associated with commercials that have yet to be broadcast during the broadcast of the content;

receive third audio data representing an input received by the first device;

process the third audio data and the commercial mark-up data to determine that the third audio data is a request to make a purchase associated with the commercial mark-up data;

generate text data to confirm the request to make a purchase;

generate purchase audio data using text-to-speech (TTS) techniques and the text data; and send the purchase audio data to the voice-controlled device for playback.

16. The language processing system of claim 11, wherein the at least one processor is further operable to:

associate a first user account with the content;

retrieve, from the first user account, first user account data related to the content;

determine updated first user account data by updating the first user account data after broadcast of the content is complete;

generate user account text data based on the updated first user account data;

apply text-to-speech (TTS) techniques to the user account text data to create user account audio data; and send the user account audio data to the voice-controlled device for playback.

17. The language processing system of claim 16, wherein the at least one processor is further operable to:

determine other user account data related to the content;

compare the other user account data to the first user account data;

determine status of the user associated with the first user account data as compared with other users associated with the other user account data;

determine text data to report a comparison of the user with the other users;

convert the text data to status audio data using text-to-speech (TTS) techniques; and send the status audio data to the voice-controlled device for playback.

18. The language processing system of claim 11, wherein the at least one processor is further operable to:

receive input audio data representing a wakeword followed by a second utterance;

process, using automatic speech recognition (ASR), the input audio data to determine input text data;

process the input text data to determine that a wakeword is present;

process the input text data to determine intent of the second utterance; and generate second output data corresponding to the intent, the second output data being unrelated to the content being displayed via the first device.

19. The language processing system of claim 11, wherein the at least one processor is further operable to:

receive a first portion of data corresponding to the content to be broadcasted;

determine, using the first audio data, that the first portion of the data expired;

receive, in response to the first portion of the data having expired, a second portion of the data corresponding to the content; and process the second audio data, the first audio data and the second portion of the data to determine the response.

20. The language processing system of claim 11, wherein the at least one processor is further operable to:

receiving third audio data captured by the voice-controlled device;

determining that the third audio data represents a second utterance spoken by the user;

processing the third audio data using automatic speech recognition (ASR) to determine input text data;

processing the input text data using natural language understanding (NLU) to determine an intent associated with the second utterance;

determining, based on the intent, that the second utterance is unrelated to the content being displayed via the first device; and generating second output data corresponding to the intent.

* * * * *